United States Patent
Homma et al.

(10) Patent No.: US 9,632,698 B2
(45) Date of Patent: Apr. 25, 2017

(54) OPERATION CONTROL DEVICE, OPERATION CONTROL METHOD AND COMPUTER PROGRAM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 847 days.

(21) Appl. No.: 12/858,140

(22) Filed: Aug. 17, 2010

(65) Prior Publication Data

US 2011/0050628 A1 Mar. 3, 2011

(30) Foreign Application Priority Data

Sep. 2, 2009 (JP) ................................. 2009-202958

(51) Int. Cl.
| | |
|---|---|
| G06F 3/045 | (2006.01) |
| G06F 3/0488 | (2013.01) |
| G06F 3/023 | (2006.01) |
| G06F 3/0482 | (2013.01) |

(52) U.S. Cl.
CPC ........ G06F 3/04886 (2013.01); G06F 3/0236 (2013.01); G06F 3/0237 (2013.01); G06F 3/0482 (2013.01); G06F 3/04883 (2013.01); G06F 2203/04802 (2013.01)

(58) Field of Classification Search
USPC ...................... 345/156–183; 178/18.01–20.04
See application file for complete search history.

(56) References Cited

U.S. PATENT DOCUMENTS

| | | | | |
|---|---|---|---|---|
| 6,686,902 | B2 * | 2/2004 | Lee ............................... | 345/157 |
| 7,477,231 | B2 * | 1/2009 | Asai ............................. | 345/104 |
| 2007/0296615 | A1 * | 12/2007 | Raguseo ........................ | 341/51 |
| 2009/0046110 | A1 * | 2/2009 | Sadler et al. ................. | 345/660 |
| 2010/0109999 | A1 * | 5/2010 | Qui ............................... | 345/156 |

FOREIGN PATENT DOCUMENTS

| | | |
|---|---|---|
| JP | 11-119882 | 4/1999 |
| JP | 2006-039745 | 2/2006 |

\* cited by examiner

*Primary Examiner* — Kent Chang
*Assistant Examiner* — Gerald Oliver
(74) *Attorney, Agent, or Firm* — Paratus Law Group, PLLC

(57) ABSTRACT

There is provided an operation control device including a pressure detecting portion that is provided in a display portion that displays an input area in which character information is input, the pressure detecting portion detecting pressure with which an operation body depresses a display surface of the display portion, and an operation control portion that switches an input mode of the character information based on a change in the pressure detected. The operation control portion determines an input of the character information, when it is detected that the pressure detected has decreased by greater than or equal to a predetermined percentage within a predetermined time period, and subsequently, the operation control portion switches the input mode of the character information based on the change in the pressure detected and on the character information that is determined to be input.

17 Claims, 14 Drawing Sheets

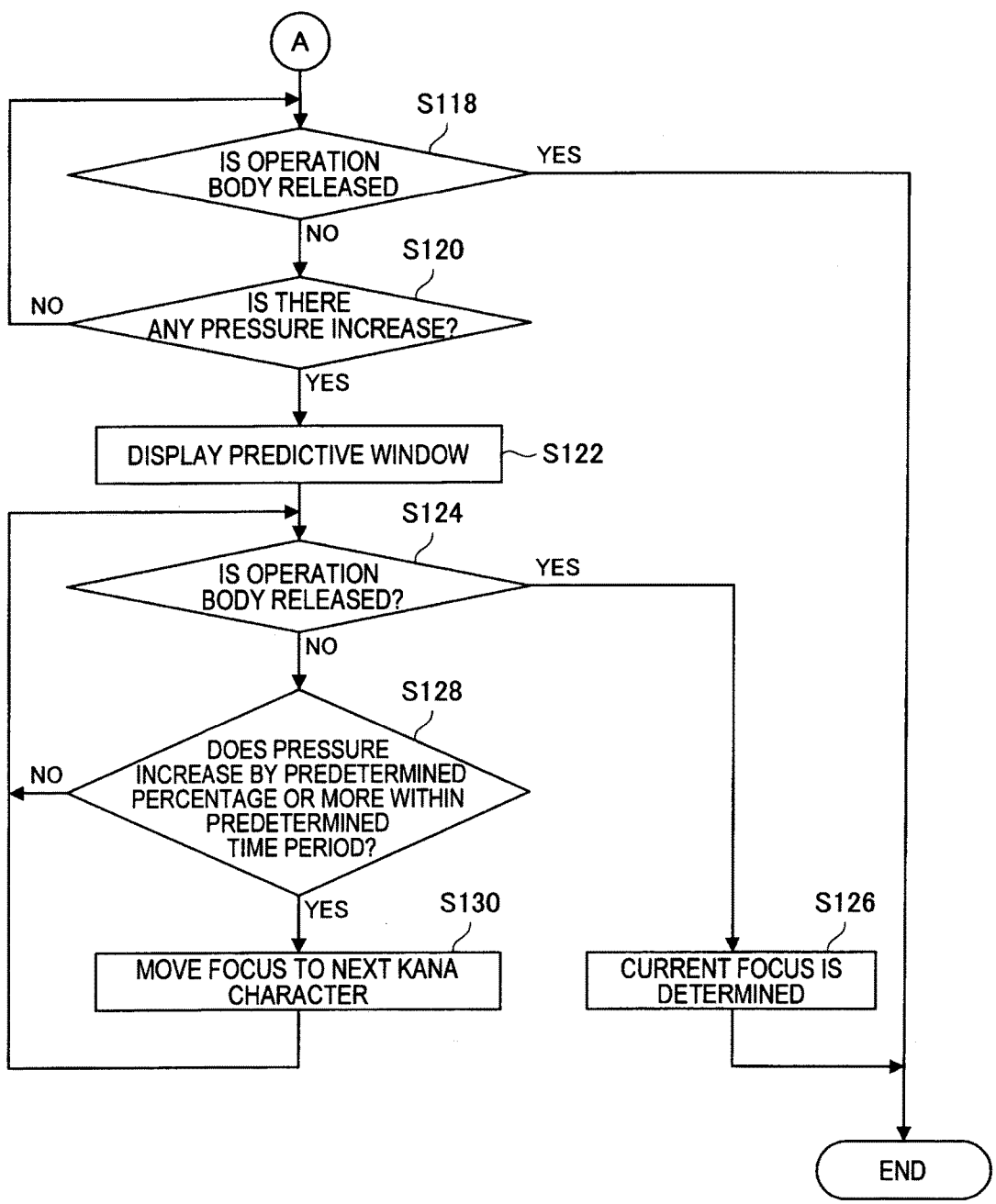

FIG. 6
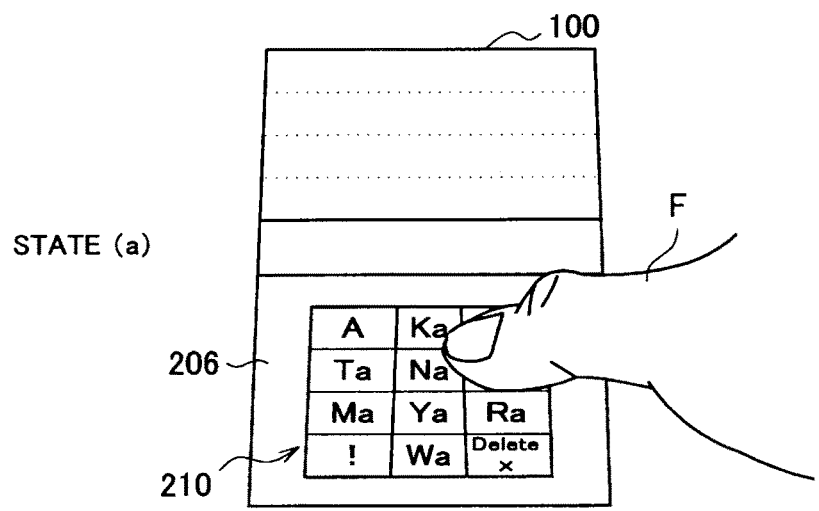
STATE (a)
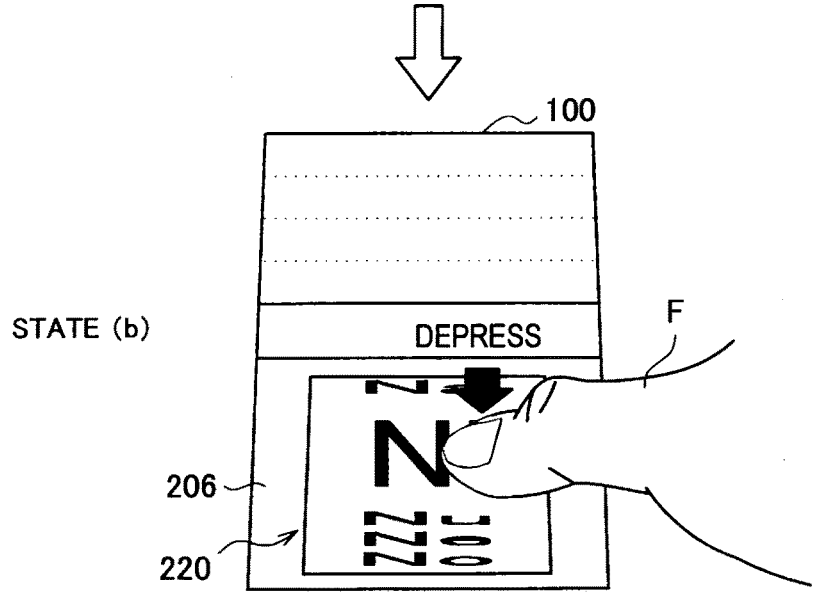
STATE (b)
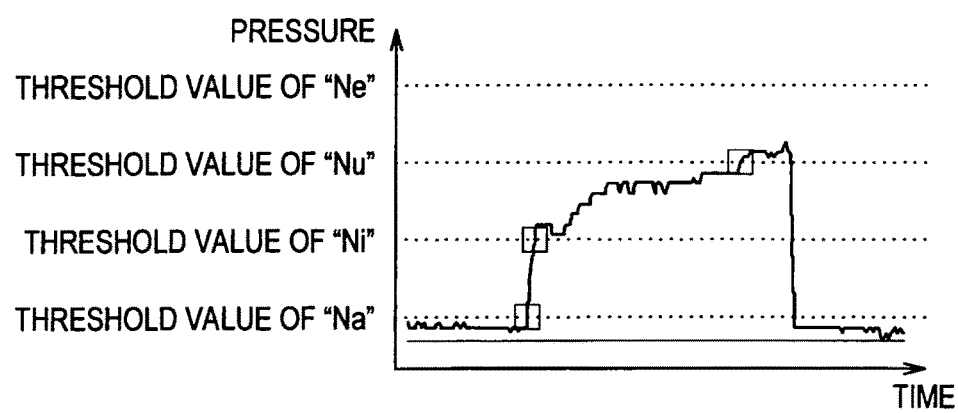

FIG. 7A
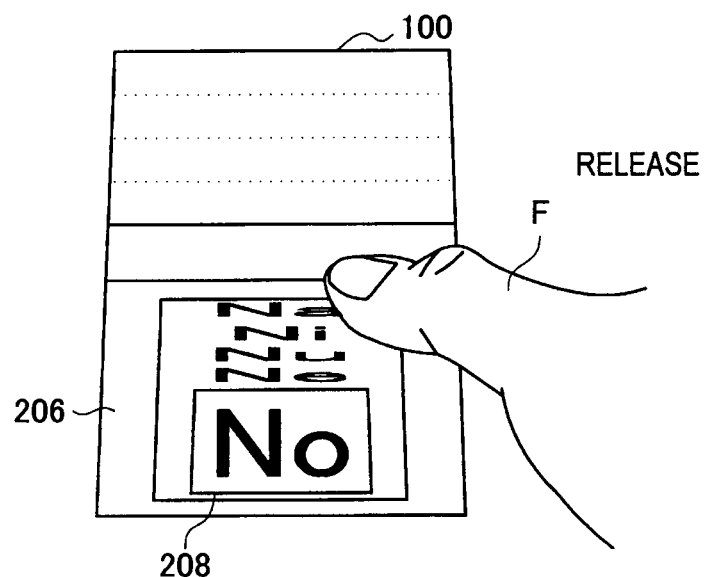
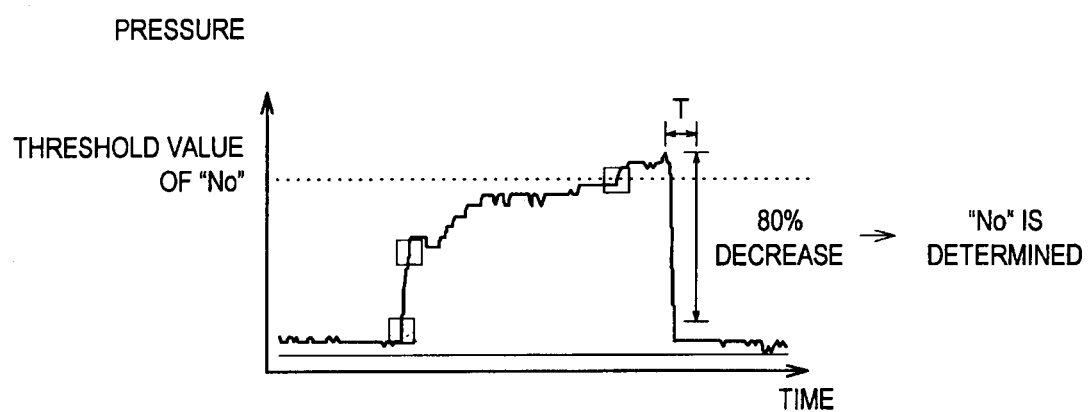

FIG. 7B
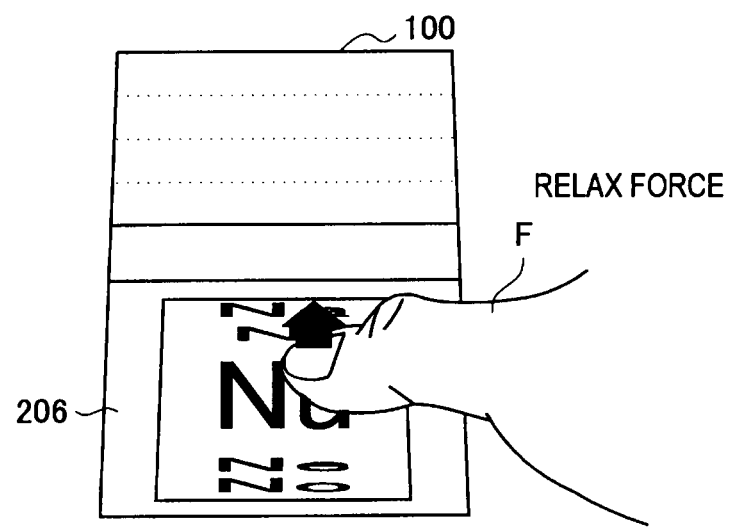
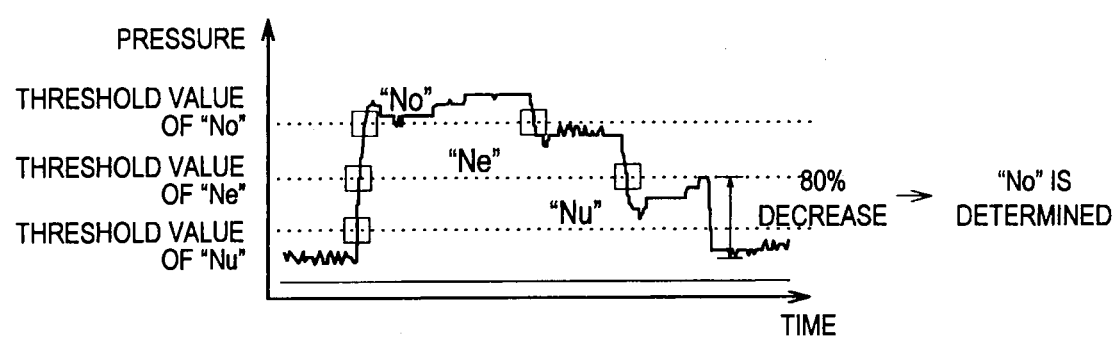

OPERATION CONTROL DEVICE, OPERATION CONTROL METHOD AND COMPUTER PROGRAM

BACKGROUND OF THE INVENTION

Field of the Invention

The present invention relates to an operation control device, an operation control method and a computer program. The present invention particularly relates to an operation control device, an operation control method and a computer program that use a software keyboard used for entering a character in a mobile information terminal.

Description of the Related Art

In recent years, thanks to advances in electronics technology, a mobile information terminal using a touch screen is widely available. In order to enter a predetermined character using such a mobile information terminal, a user may depress a corresponding key with a fingertip or an operation body such as a touch pen, using a software keyboard that is displayed in a display and has substantially the same arrangement as an actual keyboard. However, since the software keyboard displayed on the mobile information terminal using the known touch screen is displayed with substantially the same arrangement as the actual keyboard in a limited screen area, keyboard keys become small. This is therefore a significant strain on the user's eyes, and typographical errors are prone to occur. This problem is even more noticeable in a device with a small touch screen area.

In order to solve this type of problem, a method for entering a character using a pressure sensor that can detect applied pressure has been proposed (for example, Japanese Patent Application Publication No. JP-A-11-119882). In the method described in Japanese Patent Application Publication No. JP-A-11-119882, only kana characters that come at the top of each line in a 50 Japanese phonetic kana character table are allocated to each block (more specifically, when Japanese 50 kana characters are arranged vertically based on 5 vowels and horizontally based on 10 consonants, these "top kana" characters are the kana characters that come at the top of each line consisting of the same consonant, namely, "A", "Ka", "Sa", "Ta", "Na", "Ha", "Ma", "Ya", "Ra" and "Wa"). Then, when one predetermined character among the top kana characters (for example, "Na") is touched, the touched top kana character and subordinate kana characters belonging to the touched top character (for example, "Na", "Ni", "Nu", Ne", and "No") are displayed. At this time, after a focus is moved to a character that the user wants to select, the user can select the character by releasing the operation body from a contact surface, the focus being moved in accordance with an amount of pressure applied when the operation body touches the screen. In this way, in an operation in which the subordinate kana characters are selected from the top kana characters, it is possible to provide a software keyboard that uses the limited screen area efficiently while minimizing hand and eye movements. (See also Japanese Patent Application Publication No. JP-A-2006-39745).

SUMMARY OF THE INVENTION

Here, besides a simple key input, as a structural element of a known software keyboard, there is, for example, a predictive conversion input that predicts which word a user may input next and displays the word as a candidate. In addition, in a case in which a search window is provided, there is an auto complete input that supplements input information with keywords frequently input on the Internet. For example, as shown in FIG. 12, an ordinary key input screen 10, a predictive conversion input screen 20, and an auto complete input screen 30 are respectively displayed on separate windows. Here, the predictive conversion input is a higher operation performed after the key input, and the auto complete input is a higher operation performed after the predictive conversion input.

For example, when characters of "S", "O" and "N" are input from the key input screen 10, character strings that are predicted from the characters input from the key input screen 10 (for example, "SONG", "SON", "SON" (two words which are both read as "son" in Japanese) etc.) are displayed on the predictive conversion input screen 20. Next, when one character string (for example, "SONG") is selected on the predictive conversion input screen 20, the selected character string is displayed on the auto complete input screen 30 while relevant keywords are supplemented and displayed. In this way, when the character sting is input using the predictive conversion input and the auto complete input in addition to the ordinary key input, the user must perform three key inputs to complete an input of a target character string.

Further, as operation keys are respectively displayed on the three separate screens, the user must move his hand and eyes when operation moves from the key input screen 10 to the predictive conversion input screen 20, and when the operation moves from the predictive conversion input screen 20 to the auto complete input screen 30. Therefore, in addition to a load of three key inputs, a total key input operation load separately includes an eye movement load and a finger movement load that are incurred when the user moves from one screen to another.

In light of the foregoing, it is desirable to provide a novel and improved operation control device, operation control method, and computer program capable of reducing an operational load and improving operability.

According to an embodiment of the present invention, there is provided an operation control device including a pressure detecting portion that is provided in a display portion that displays an input area in which character information is input, the pressure detecting portion detecting pressure with which an operation body depresses a display surface of the display portion to operate the input area, and an operation control portion that switches an input mode of the character information based on a change in the pressure detected by the pressure detecting portion. The operation control portion determines an input of the character information that is selected by operation of the operation body that is in contact with the display surface, when it is detected that the pressure detected by the pressure detecting portion has decreased by greater than or equal to a predetermined percentage within a predetermined time period, and subsequently, the operation control portion switches the input mode of the character information based on the change in the pressure detected by the pressure detecting portion and on the character information that is determined to be input.

According to the present invention, after the character information is selected by causing the operation body to depress the display surface, an input of the selected character information is determined by causing the pressure with which the operation body depresses the display surface to decrease by greater than or equal to a predetermined percentage within a predetermined time period. Then, subsequently, by changing the pressure with which the operation body depresses the display surface, an input mode of the character information can be switched based on a change in the pressure and on the character information that is determined to be input. In this way, it is possible to reduce the movement of the operation body and also reduce eye movements, since switching of the input mode can be operated by an amount of the pressure with which the operation body depresses the display surface.

Here, after the input of the selected character information is determined, when the pressure detected by the pressure detecting portion exceeds a repeated depressing pressure threshold value, the operation control portion may switch to a higher input mode used to input information that supplements the already input character information. When the pressure detected by the pressure detecting portion falls below a release threshold value at which it is determined that the operation body is separated from the display surface of the display portion, the operation control portion may switch to a pre-set input mode.

Moreover, in a character input mode in which one character can be input at a time, the operation control portion may determine an input of a character that is selected, when it is detected that the pressure detected by the pressure detecting portion has decreased by greater than or equal to the predetermined percentage within the predetermined time period, and subsequently, when the pressure detected by the pressure detecting portion exceeds the repeated depressing pressure threshold value, the operation control portion may display at least one predictive conversion character string in the display portion, the predictive conversion character string being a predicted candidate to be input consecutively after an already input character, and may switch to a predictive conversion input mode in which the predictive conversion character string can be input.

Furthermore, in the predictive conversion input mode, the operation control portion may determine an input of the predictive conversion character string that is selected, when it is detected that the pressure detected by the pressure detecting portion has decreased by greater than or equal to the predetermined percentage within the predetermined time period, and subsequently, when the pressure detected by the pressure detecting portion exceeds the repeated depressing pressure threshold value, the operation control portion may display, in the display portion, auto complete character information to which is added a character string that supplements the predictive conversion character string that is determined to be input, and may switch to an auto complete input mode in which the auto complete character information can be input.

Moreover, in the character input mode in which one character can be input at a time, the operation control portion may determine the input of the character that is selected, when it is detected that the pressure detected by the pressure detecting portion has decreased by greater than or equal to the predetermined percentage within the predetermined time period, and subsequently, when the pressure detected by the pressure detecting portion exceeds the repeated depressing pressure threshold value, the operation control portion may switch to a repeated input mode in which the character that is determined to be input in the character input mode can be repeatedly input.

When it is detected that the pressure detected by the pressure detecting portion has decreased by greater than or equal to the predetermined percentage within the predetermined time period, and a plurality of character information correspond to the input area that is operated by the operation body, the operation control portion may display the plurality of character information that correspond to the input area in the display portion, and may switch to a subordinate character input mode in which the character information can be input, when the pressure detected by the pressure detecting portion exceeds the repeated depressing pressure threshold value, and the operation control portion may determine an input of top character information among the plurality of character information that correspond to the input area, and may switch to a pre-set input mode, when the pressure detected by the pressure detecting portion falls below the release threshold value at which it is determined that the operation body is separated from the display surface of the display portion.

According to another embodiment of the present invention, there is provided an operation control method, including the steps of detecting pressure with which an operation body depresses a display surface of a display portion that displays an input area in which character information is input, the operation body operating the input area, determining character information that is selected by operation of the operation body that is in contact with the display surface, when the detected pressure has decreased by greater than or equal to a predetermined percentage within a predetermined time period; and subsequently, switching an input mode of the character information based on an change in the detected pressure and on the character information that is determined to be input.

According to another embodiment of the present invention, there is provided a computer program for causing a computer to function as the operation control device described above. The computer program is stored in a storage device included in the computer, and it is read and executed by a CPU included in the computer, thereby causing the computer to function as the operation control device described above. Moreover, there is also provided a computer readable recording medium in which the computer program is stored. The recording medium may be a magnetic disk, an optical disk and the like, for example.

According to the embodiments of the present invention described above, there are provided the novel and improved operation control device, operation control method, and computer program capable of reducing the operational load and improving the operability.

BRIEF DESCRIPTION OF THE DRAWINGS

FIG. 5B is a flow chart illustrating the operation control method using the operation control device according to the present embodiment;

FIG. 6 is an explanatory diagram illustrating an operation of selecting a subordinate kana character;

FIG. 7A is an explanatory diagram illustrating an operation of determining the subordinate kana character;

FIG. 7B is an explanatory diagram illustrating an operation of returning a focus location of the subordinate kana character;

DETAILED DESCRIPTION OF THE EMBODIMENT(S)

Figure 1:
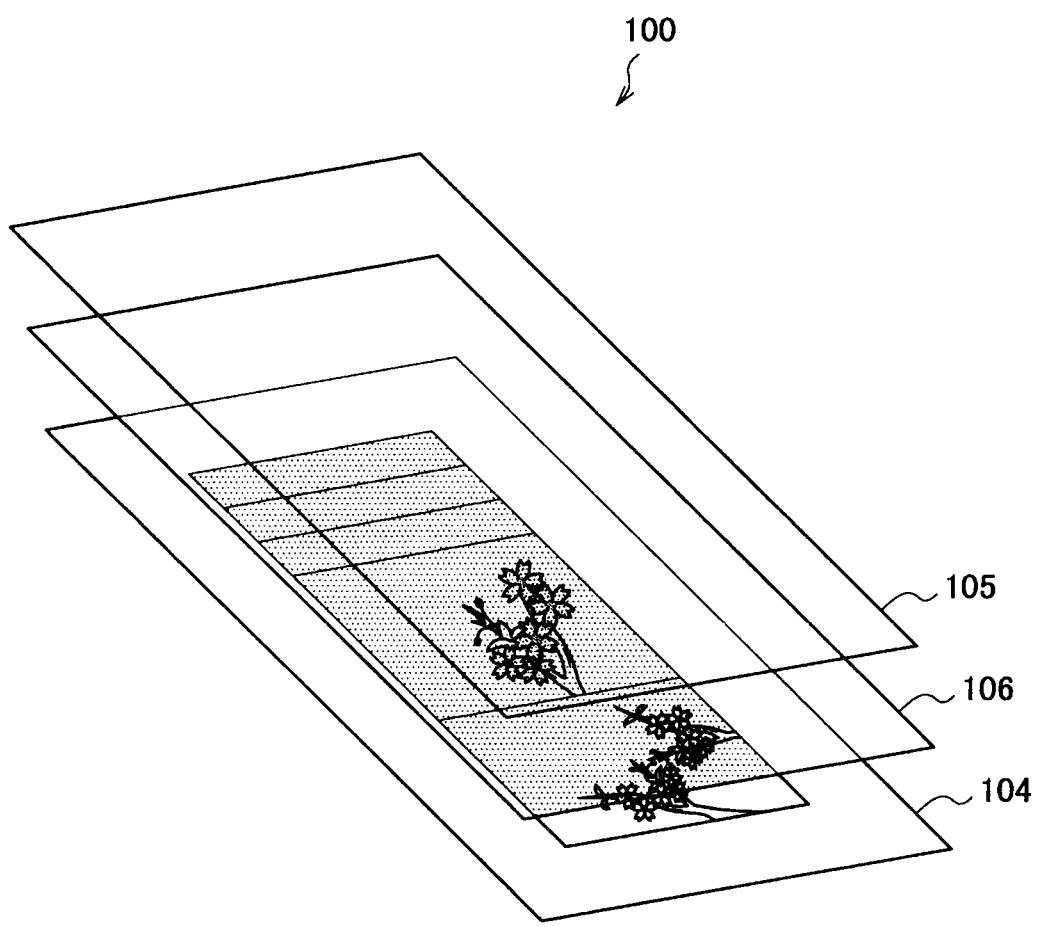
FIG. 1 is an explanatory diagram illustrating a configuration of a display device of an input display device that includes an operation control device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that explanations will be provided below in the following order:

1. First embodiment (an example of a software keyboard to input a kana character in a phased manner)
2. Second embodiment (an example of a software keyboard with a QWERTY key layout)

1. First Embodiment

Configuration Example of a Display Device of an Input Display Device

Figure 2:
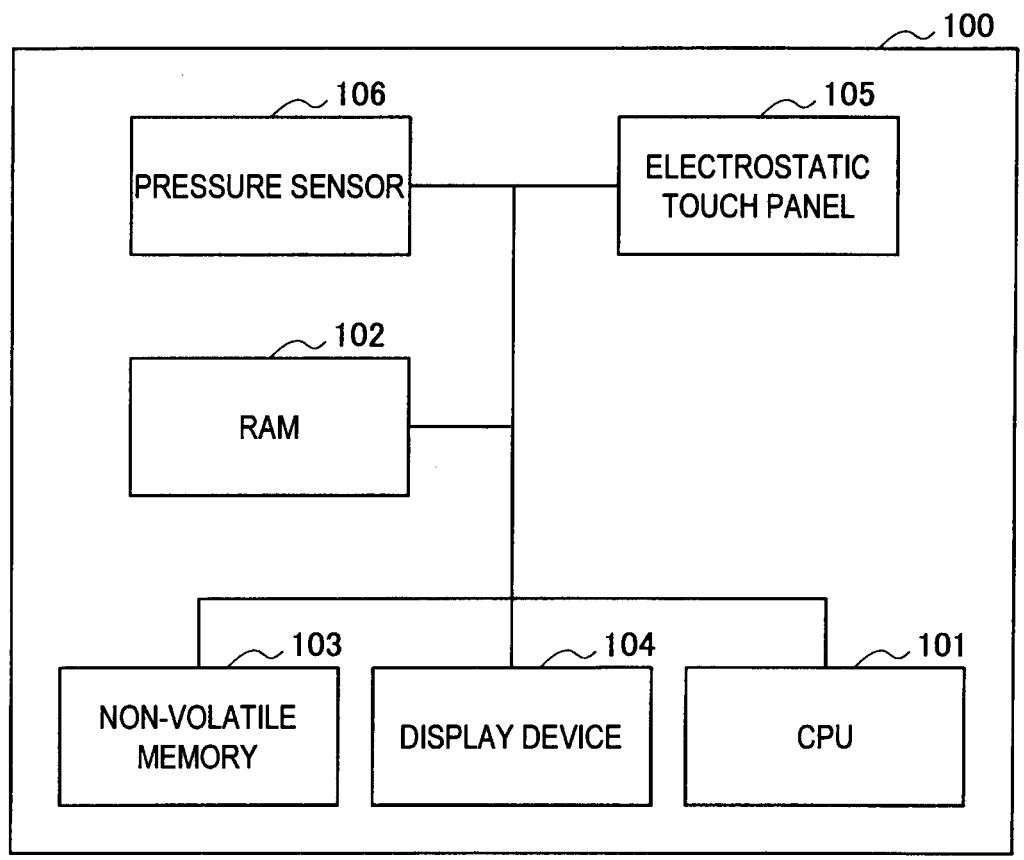
FIG. 2 is a block diagram illustrating a hardware configuration of the input display device that includes the operation control device according to the present embodiment.
Figure 3:
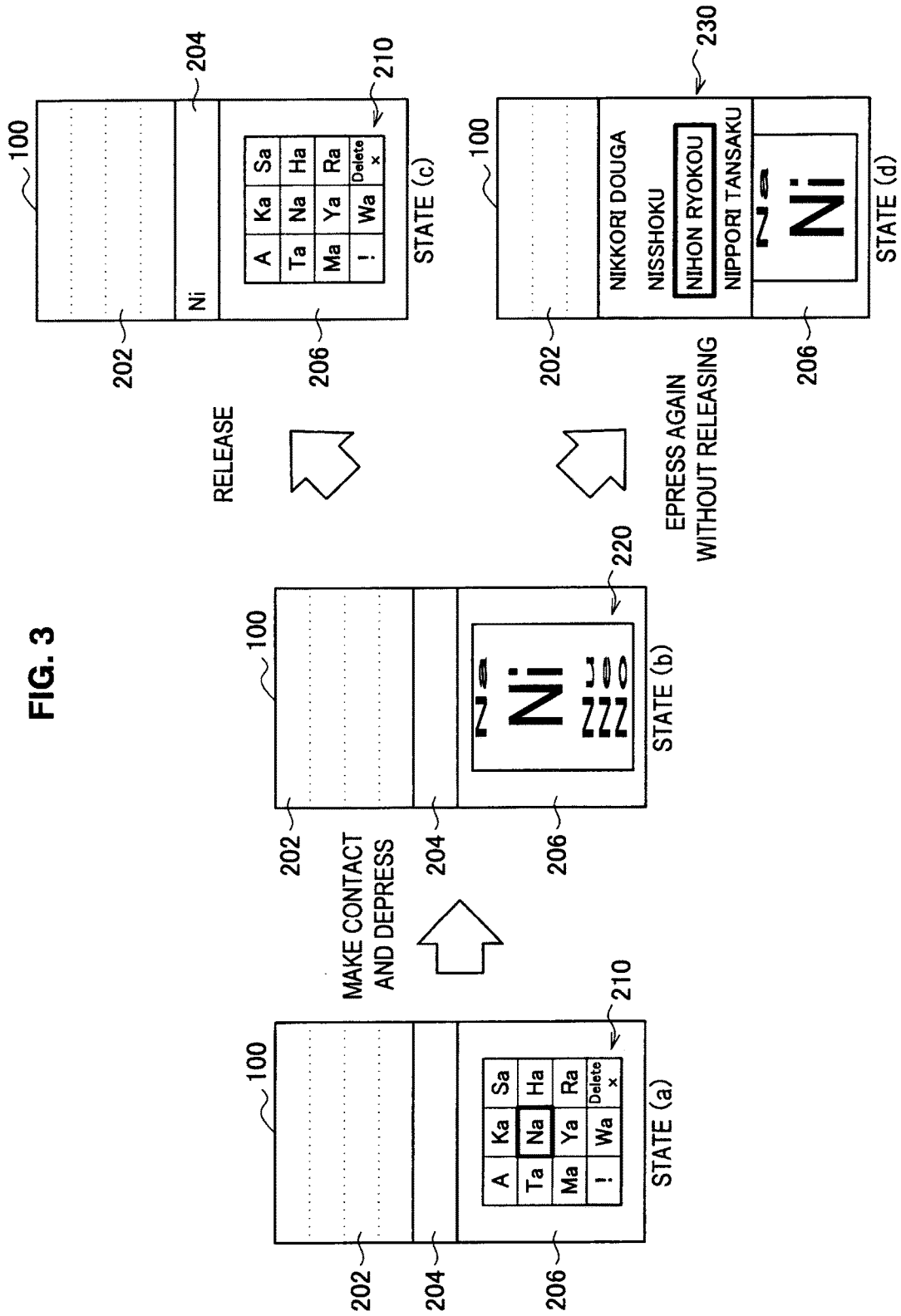
FIG. 3 is an explanatory diagram illustrating an example of a screen configuration of the input display device according to the present embodiment.

First, with reference to FIGS. 1 to 3, a configuration example of a display device of an input display device that includes an operation control portion according to a first embodiment of the present invention and a general overview of the input display device will be explained. Note that FIG. 1 is an explanatory diagram illustrating a configuration of a display device of an input display device 100 that includes the operation control portion according to the present embodiment. FIG. 2 is a block diagram illustrating a hardware configuration of the input display device 100 that includes the operation control portion according to the present embodiment. FIG. 3 is an explanatory diagram illustrating an example of a screen configuration of the input display device 100 according to the present embodiment.

The input display device 100 that includes the operation control portion according to the present embodiment is a device on which information can be input by using an operation body to touch or further depress a display surface of a display device that displays the information. By having the operation body touch an object, such as an icon, a character key etc., which is displayed in the display device, a user can select or determine the object that is touched by the operation body. Further, the user can also perform operation of scrolling a screen etc. by moving the operation body while keeping the operation body in contact with the display surface.

As shown in FIG. 1, an input display portion (corresponding to reference number 110 in FIG. 4) of the input display device 100 includes a sheet-form pressure sensor 106 and an electrostatic touch panel 105, which have a layered configuration on a display surface side of a display device 104.

The electrostatic touch panel 105 is a detecting portion that detects a contact on the display surface by the operation body. The electrostatic touch panel 105 is provided with electrostatic sensors arranged in a grid pattern. The electrostatic sensors constantly change their values in response to changes in electrostatic capacitance. When the operation body, (a finger, for example), comes close to or touches the electrostatic sensors, the electrostatic capacitance detected by the electrostatic sensors increases. It is possible to obtain the electrostatic capacitance of each electrostatic sensor simultaneously. Through simultaneously detecting and interpolating changes in electrostatic capacitance of all the electrostatic sensors, it is possible to detect a shape of the finger which comes close to or touches the electrostatic sensors. The electrostatic touch panel 105 outputs a detected electrostatic capacitance value to a central processing unit (CPU; reference number 101 in FIG. 2).

Further, the pressure sensor 106 is a detecting portion that detects pressure with which the display surface is depressed. The pressure sensor 106 forms an electrode surface, for example, with two sheet panels. The pressure sensor 106 may be a resistive film pressure sensor that detects a location by detecting energization in a depressed section. Like the electrostatic touch panel 105, the pressure sensor 106 also has a plurality of detection points provided in a sheet, the detection points detecting a depressed location. It is possible to detect energization at each detection point simultaneously. The pressure sensor 106 outputs the pressure with which the display surface is depressed to the CPU, the pressure being detected by each of the detection points.

The CPU associates various pieces of information that are input from the electrostatic touch panel 105 and the pressure sensor 106 with a display location of display content displayed on the display device 104, and analyzes movements of the operation body. Then, based on the analyzed movements of the operation body, the CPU recognizes input information that is input into the input display device 100, and performs processing corresponding to the input information. In this way, the user can input the input information by operating the content displayed on the display surface. Note that when the operation body is made to touch or depress the display surface of the display device 104, in actuality, the operation body does not make contact with the display surface of the display device 104, but with a surface of the electrostatic touch panel 105. In this way, even when the operation body is actually making contact with the surface of the electrostatic touch panel 105, it may be described below as "the operation body is making contact with the display surface of the display device 104".

Hardware Configuration

Next, with reference to FIG. 2, a hardware configuration of the input display device 100 that includes the operation control portion according to the present embodiment will be explained. As shown in FIG. 2, the input display device 100 includes a CPU 101, a random access memory (RAM) 102, a nonvolatile memory 103, the display device 104, the electrostatic touch panel 105 and the pressure sensor 106.

As described above, the CPU 101 functions as an arithmetic processing device and a control device, and controls the overall operations within the input display device 100 in accordance with a variety of programs. Here, the CPU 101 may be a microprocessor. The RAM 102 temporarily stores programs used in execution of the CPU 101 and parameters etc. that vary in accordance with the execution of the CPU 101. These portions are mutually connected by a host bus that is formed of a CPU bus and the like. The nonvolatile memory 103 stores programs, calculation parameters etc. that are used by the CPU 101. As the nonvolatile memory 103, for example, a read only memory (ROM), a flash memory etc. may be used.

The display device 104 is one example of an output device that outputs information. As the display device 104, for example, a liquid crystal display (LCD) device, an organic light emitting diode (OLED) device and the like may be used. The electrostatic touch panel 105 is one example of an input device with which the user inputs information. The electrostatic touch panel 105 includes an input unit for inputting information and an input control circuit. The input control circuit generates an input signal based on an input by the user and outputs the input signal to the CPU 101. Like the electrostatic touch panel 105, the pressure sensor 106 is also one example of the input device with which the user inputs information. The electrostatic touch panel 105 and the pressure sensor 106 can be provided with the above-described configurations.

The user can input various data or instruct processing operations on the input display device 100 by operating the electrostatic touch panel 105 and the pressure sensor 106. In the input display device 100 according to the present embodiment, the electrostatic touch panel 105 is used as a contact detecting portion that detects a contact by the operation body which sets off operation control processing, and the pressure sensor 106 is used as a pressure detecting portion that detects operation for switching operation processing.

Screen Configuration Example

It will be assumed below that the operation control portion provided in the input display device 100 according to the present embodiment performs operation control of a character input using a software keyboard as shown in FIG. 3. In the software keyboard used in the input display device 100 according to the present embodiment, the user determines a character to be input in a phased manner. For example, a case is explained below in which a kana character is input into the input display device 100. As illustrated by a state (a) in FIG. 3, the display surface of the input display device 100 is divided into an input character display area 202 that displays an already input character, a provisional input display area 204 in which a character is provisionally input, and an operation area 206 in which information is input.

The state (a) in FIG. 3 is a state in which the character input is started. At this point in time, the operation area 206 is set in a character input mode. In the character input mode, a top kana character layout keyboard 210, on which top kana characters are arranged, is displayed. On the top kana character layout keyboard 210, 12 keys, including "A", "Ka", "Sa", "Ta", "Na", "Ha", "Ma", "Ya", "Ra", "Wa", and two "Symbols" ("!" and "Delete") are arranged in a grid pattern. First, from the top kana character layout keyboard 210, the user selects one key by causing the operation body, such as a finger etc., to make contact with and depress a top kana character of a line to which belongs a character that the user wants to input.

When one key is selected from the top kana character layout keyboard 210, the subordinate kana characters, which are subordinate to the top kana character of the selected key, are displayed. For example, it is assumed that the key for the top kana character "Na" is selected in the state (a) in FIG. 3. In this case, the top kana character "Na" and the subordinate kana characters which are subordinate to the top kana character "Na", namely, "Na", "Ni", "Nu", "Ne", "No" etc. are displayed. For example, as shown by a state (b) in FIG. 3, the subordinate kana characters may be displayed as a scroll list 220 in which the characters are arranged in a single line. A focused character in the scroll list 220 is a character that can be selected. At this time, by displaying the focused character after enlarging it using the operation control portion, it is possible to make it easier for the user to select the character.

By operating the operation body on the display surface, the user scrolls the scroll list 220 and focuses the character the user wants to input. After that, when the user releases the operation body from the display surface, input of the focused character is determined. For example, in the state (b) in FIG. 3, it is assumed that the subordinate kana character "Ni" is determined. In this case, the subordinate kana character "Ni" is displayed in the provisional input area 204 as shown by a state (c) in FIG. 3. Then, in the operation area 206, the top kana character layout keyboard 210 in the state (a) is displayed. In this way, input of the next character can be started.

On the other hand, after focusing the character the user wants to input, by depressing the key again using the operation body without releasing it from the display surface, the user can display a predictive conversion window 230, in which predictive conversion character strings related to the focused character are listed and displayed. For example, in the state (b) in FIG. 3, it is assumed that, after the user depresses the display surface with the operation body to select the subordinate kana character "Ni", the user depresses the display surface again with the operation body without releasing the operation body from the display surface. Then, as shown in a state (d) in FIG. 3, the predictive conversion window 230 is displayed above the scroll list 220 of the operation control area 206, and an input mode is switched to a predictive conversion input mode.

In the predictive conversion window 230, the predictive conversion character strings that start with the character "Ni" are listed and displayed, the character "Ni" being selected from the scroll screen 220, and a predictive conversion character string selected on the list is focused. At this time, for example, the user can move the focus in the list by repeatedly depressing the display surface with the operation body without releasing the operation body from the display surface. Then, the user can determine input of the predictive conversion character string by releasing the operation body from the display surface when the predictive conversion character string the user wants to input is focused. When the input of the predictive conversion character string is determined, the predictive conversion character string is displayed in the provisional input area 204, the top kana character layout keyboard 210 in the state (a) in FIG. 3 is displayed in the operation area 206, and the input mode returns to the character input mode.

In this way, in the input display device 100 provided with the operation control portion according to the present embodiment, in a process of determining the character to be input in a phased manner, it is possible to switch the input mode to a next operable mode in accordance with whether or not the operation body is released from the display surface after the operation body has once made contact with the display surface. Therefore, since it is possible to operate a plurality of input modes in the same screen, a burden in terms of the user's eye movement and finger movement can be reduced, and operability can be improved.

Figure 4:
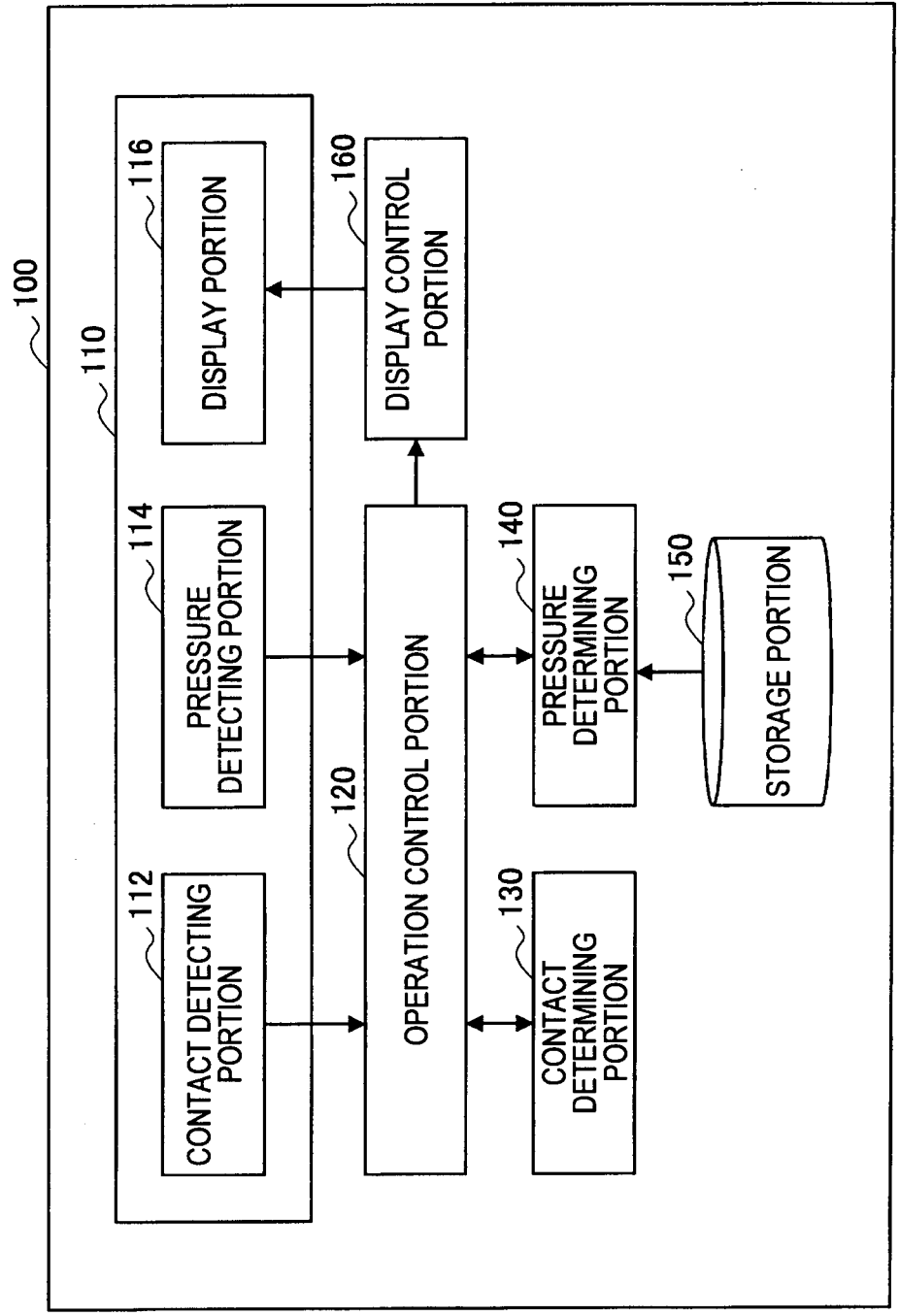
FIG. 4 is a block diagram illustrating a functional configuration of the input display device according to the present embodiment.
Figure 5A:
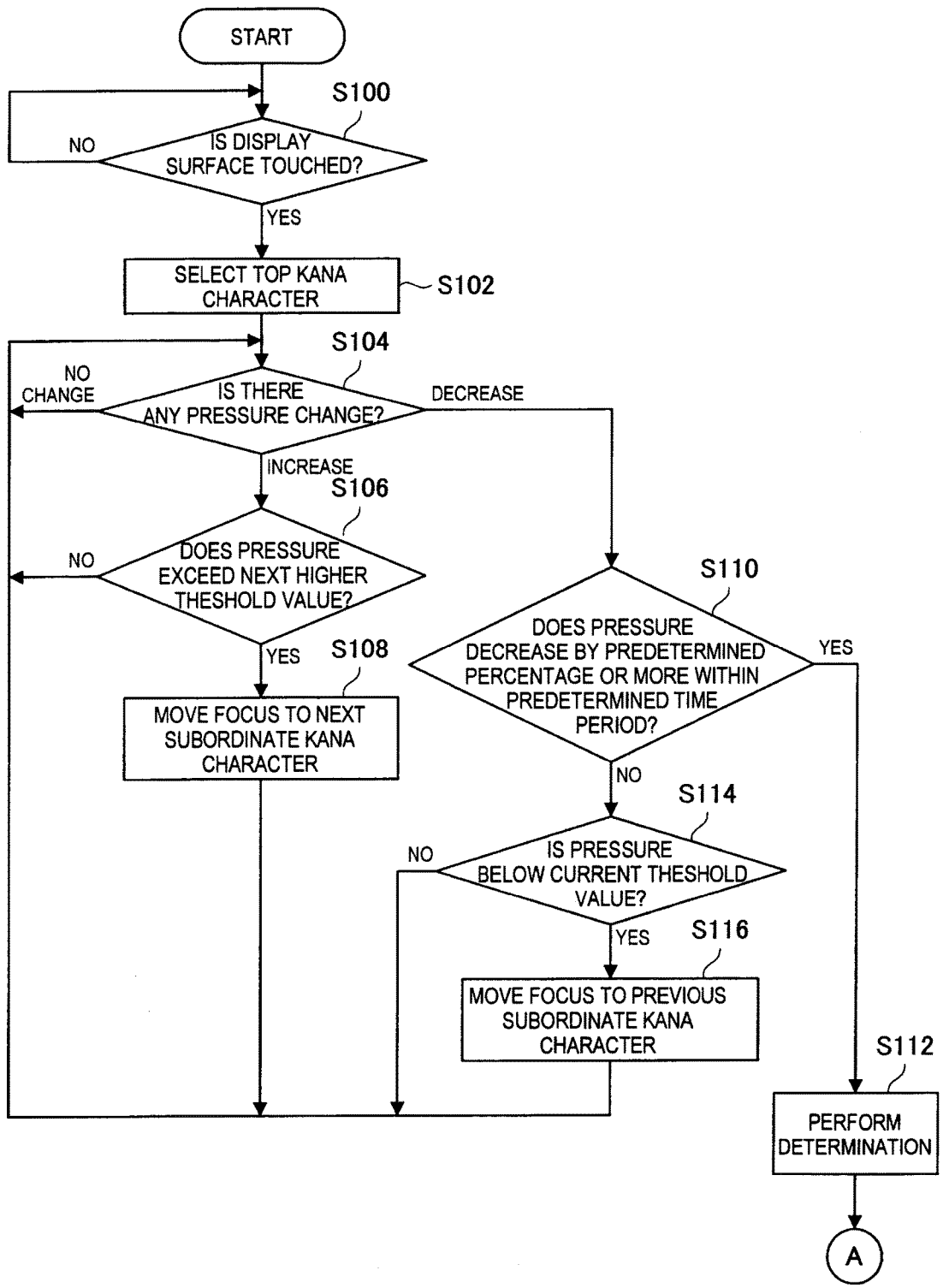
FIG. 5A is a flow chart illustrating an operation control method using the operation control device according to the present embodiment.
Figure 8:
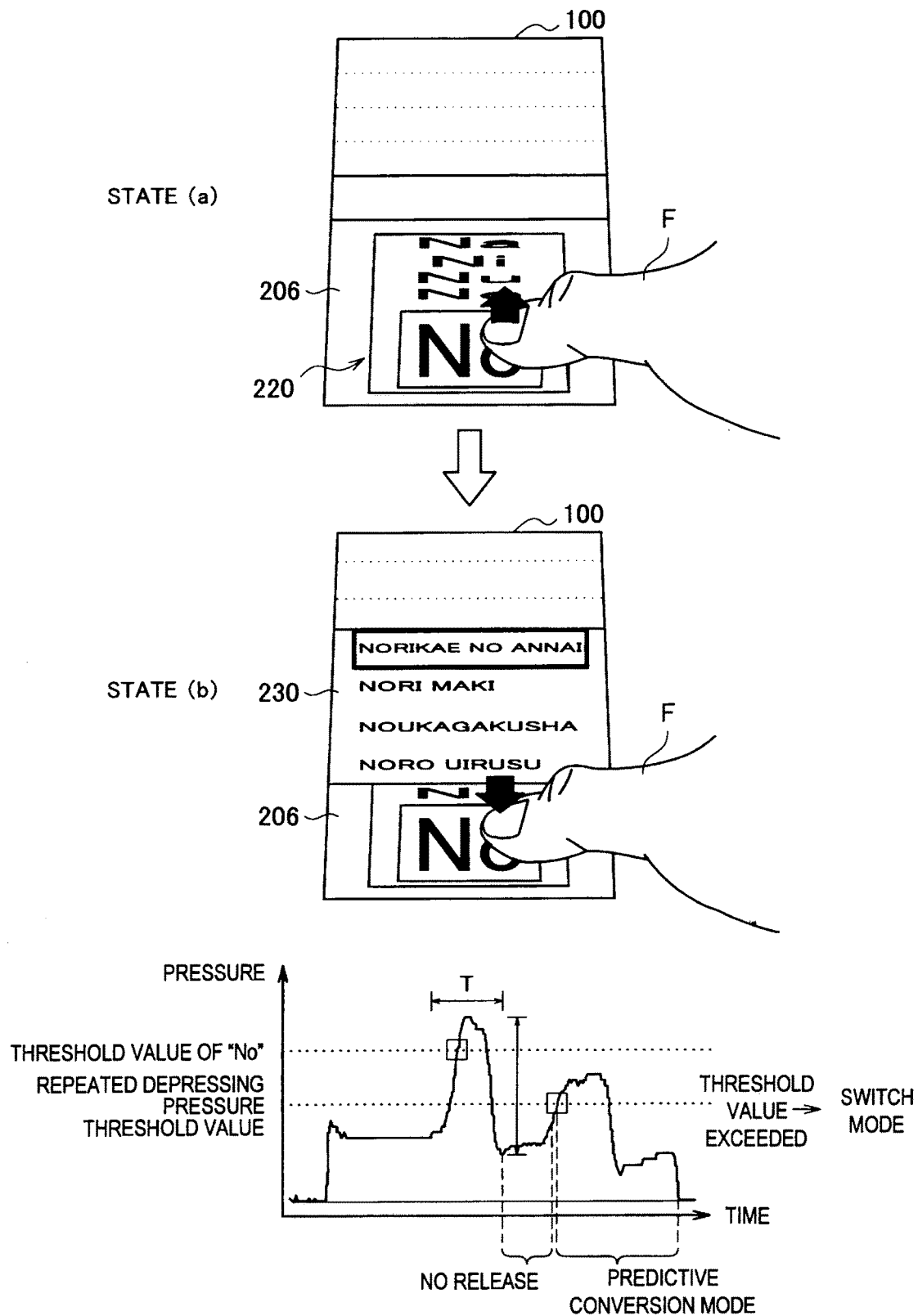
FIG. 8 is an explanatory diagram illustrating an operation of displaying a predictive conversion window after determining the subordinate kana character.
Figure 9:
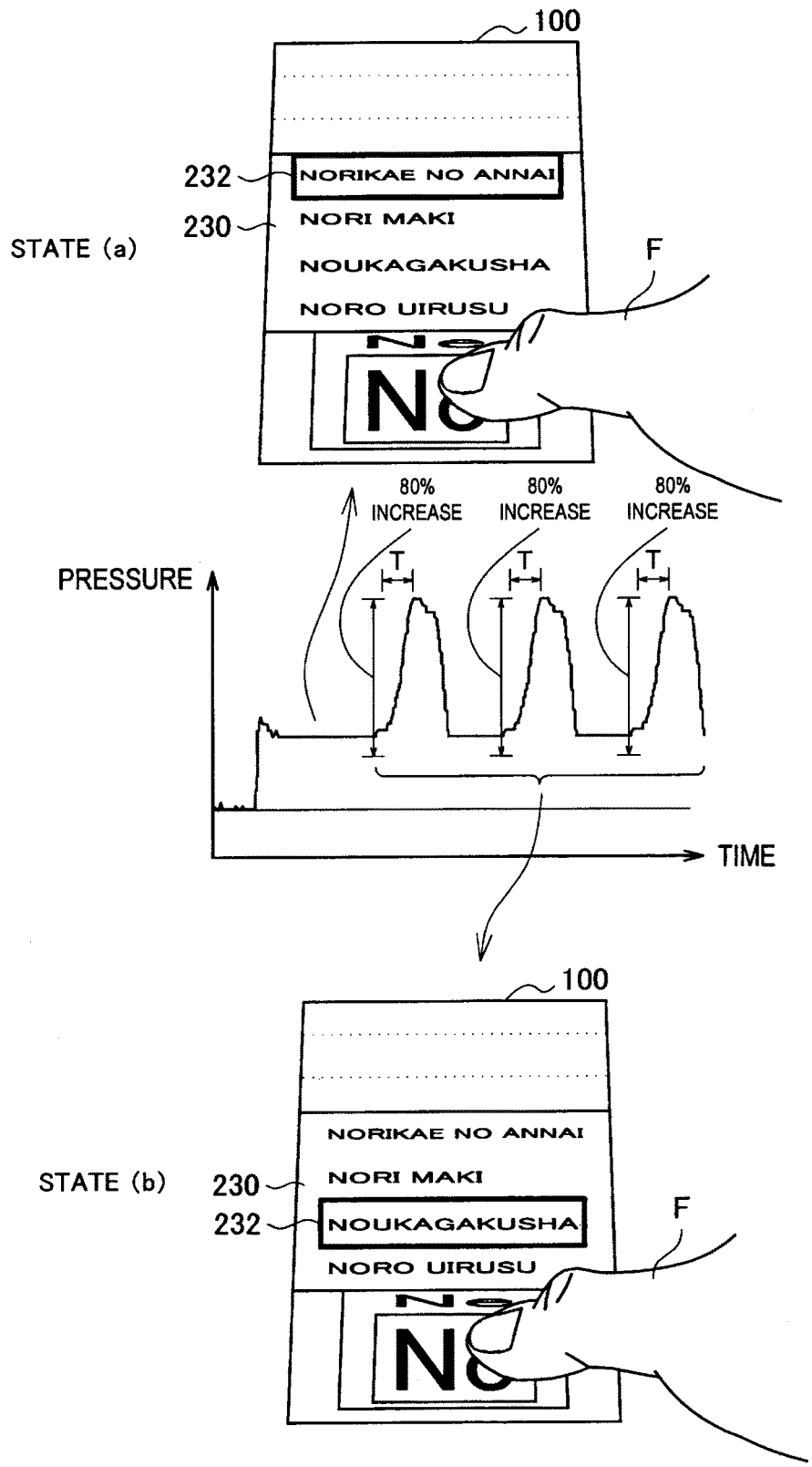
FIG. 9 is an explanatory diagram illustrating an operation of scrolling predictive conversion input character strings.

A general configuration and a function of the input display device 100 provided with the operation control portion according to the present embodiment are explained above. Operation control in the input control device 100 will be described below in more detail with reference to FIG. 4 to FIG. 9. Note that FIG. 4 is a block diagram illustrating a functional configuration of the input display device 100 according to the present embodiment. FIG. 5A and FIG. 5B are flow charts illustrating an operation control method using the operation control portion according to the present embodiment. FIG. 6 is an explanatory diagram illustrating an operation of selecting a subordinate kana character. FIG. 7A is an explanatory diagram illustrating an operation of determining the subordinate kana character. FIG. 7B is an explanatory diagram illustrating an operation of returning a focus location of the subordinate kana character. FIG. 8 is an explanatory diagram illustrating an operation of displaying the predictive conversion window after determining the subordinate kana character. FIG. 9 is an explanatory diagram illustrating an operation of scrolling the predictive conversion character strings.

Functional Configuration of Input Display Device

First, with reference to FIG. 4, the functional configuration of the input display device 100 according to the present embodiment will be explained. As illustrated in FIG. 4, the input display device 100 includes the input display portion 110, an operation control portion 120, a contact determining portion 130, a pressure determining portion 140, a storage portion 150 and a display control portion 160.

The input display portion 110 is a functional portion that displays information and inputs information, and includes a contact detecting portion 112, a pressure detecting portion 114 and a display portion 116. The contact detecting portion 112 corresponds to the electrostatic touch panel 105 in FIG. 2, and detects the value of the electrostatic capacitance that changes in accordance with whether or not the operation body makes contact with a display surface of the display portion 116. As described above, when the operation body makes contact with the display surface, the electrostatic capacitance detected by the contact detecting portion 112 increases. In this way, it is possible to determine that the operation body has made contact with the display surface when the electrostatic capacitance detected by the contact detecting portion 112 exceeds a predetermined value. The contact detecting portion 112 outputs the detected electrostatic capacitance value to the operation control portion 120 as a detection result.

The pressure detecting portion 114 corresponds to the pressure sensor 106 in FIG. 2, and detects pressure applied when the operation body depresses the display surface of the display portion 116. As described above, the pressure detecting portion 114 outputs an electrical signal corresponding to an amount of the pressure to the operation control portion 120 as a detection result. The display portion 116 is an output device that corresponds to the display device 104 in FIG. 2, and displays information on which the display control portion 160 has performed display processing.

The operation control portion 120 is a control portion that controls operation of display content on the display portion 116 based on the detection results input from the contact detecting portion 112 and the pressure detecting portion 114. The operation control portion 120 outputs the electrostatic capacitance value input from the contact detecting portion 112 to the contact determining portion 130, and causes the contact determining portion 130 to determine whether or not the operation body has made contact with the display surface of the display portion 116. Then, after receiving a determination result of the contact determining portion 130, the operation control portion 120 determines, based on the determination result, whether or not it starts the operation control processing.

Further, the operation control portion 120 outputs the electrical signal that is input from the pressure detecting portion 114 to the pressure determining portion 140, the electrical signal indicating the amount of the pressure. In addition, the operation control portion 120 causes the pressure determining portion 140 to determine the amount of the pressure and an amount of a pressure change caused by movements of the operation body. Then, after receiving the determination result of the pressure determining portion 140, the operation control portion 120, based on the determination result, switches an input operation screen of the input display device 100. The operation control portion 120 outputs switching information of the input operation screen to the display control portion 160.

Based on the detection result of the contact determining portion 130, the contact determining portion 130 determines whether or not the operation body makes contact with the display surface of the display portion 116 and the contact location. When the electrostatic capacitance value detected by each electrostatic sensor of the contact detecting portion 112 is input from the operation control portion 120, the contact determining portion 130 determines whether or not the operation body is making contact with the display surface of the display portion 116. The contact determining portion 130 determines that the operation body has made contact with the display surface when an amount of increase of the electrostatic capacitance exceeds a predetermined value. Further, the contact determining portion 130 can recognize the contact location of the operation body on the display surface based on a location of the electrostatic sensor that has detected the electrostatic capacitance exceeding the predetermined value. Then, the contact determining portion 130 outputs the determination result concerning whether or not the operation body has made contact with the display surface and, in a case when it is determined that the contact has been made, it also outputs the contact location of the operation body to the operation control portion 120.

Based on the detection result of the pressure detecting portion 114, the pressure determining portion 140 determines the amount of the pressure applied when the operation body depresses the display surface. In the input display device 100 according to the present embodiment, the user can switch the input operation screen (namely, the input mode) and move the focus by changing the amount of the pressure with which the user depresses the display surface. Then, the pressure determining portion 140 determines the amount of the pressure applied to the display surface, and the amount of change in the pressure applied, such that the kind of operation the user is trying to perform using the operation control portion 120 is determined. At this time, with reference to the storage portion 150, the pressure determining portion 140 compares the amount of the pressure applied to the display surface with various pressure threshold values, and outputs a comparison result to the operation control portion 120.

The storage portion 150 corresponds to the nonvolatile memory 103 in FIG. 2, and stores various pieces of setting information used for determining the amount of the pressure applied to the display surface. The setting information includes, for example, pressure threshold values set for each character, which are used when scrolling a list of characters, a pressure decrease rate, which is a standard for switching the input operation screen, and a pressure increase rate, which is a standard for moving the focus in a list of the predictive conversion character strings etc.

Based on the switching information of the input operation screen determined by the operation control portion 120, the display control portion 160 switches the input operation screen that is displayed on the display portion 116. The display control portion 160 generates display information for displaying the input operation screen, and outputs the display information to the display portion 116.

The functional configuration of the input display device 100 according to the embodiment is explained above. Next, with reference to FIG. 5A to FIG. 9, the operation control method using the operation control portion 120 of the input display device 100 according to the present embodiment will be explained. Here, the operation control method for inputting kana characters will be explained, the operation control method being illustrated in FIG. 3.

Operation Control Method

When the user inputs the kana characters using the input display device 100, the user performs a predetermined operation, for example, depressing a keyboard display button etc., and displays the top kana character layout keyboard 210, as shown in the state (a) in FIG. 3, in the operation area 206. Then, by having the operation body make contact with the display surface, the user selects the top kana character to which belongs the character the user wants to input. Through this operation, operation control processing of FIG. 5A is started.

First, as illustrated in FIG. 5A, it is determined whether or not the operation body makes contact with (touches) the display portion 116 (step S100). The contact with the display surface by the operation body is determined by the contact determining portion 130 based on whether or not the electrostatic capacitance value detected by the contact detecting portion 112 exceeds the predetermined electrostatic capacitance value. The contact determining portion 130 determines that the operation body has made contact with the display surface when the electrostatic capacitance value detected exceeds the predetermined value, and determines that the operation body has not made contact with the display surface when the electrostatic capacitance value detected is less than the predetermined value. Based on this determination, the determination at step S100 is repeated until the contact with the display surface by the operation body is detected.

At step S100, when the contact with the display surface by the operation body is detected, the top kana character which is displayed at the contact location of the operation body is selected (step S102). For example, as illustrated by a state (a) in FIG. 6, it is assumed that the contact with the display surface by the operation body is detected in a "Na" key area of the top kana character layout keyboard 210, the operation body being a finger F. Thus, selection of the "Na" key is determined, and the scroll list 220 is displayed in the operation area 206 as illustrated by a state (b) in FIG. 6. When the scroll list 220 is displayed, the user brings the focus onto the subordinate kana character to be input by changing the pressure with which the finger F depresses the display surface, the finger F making contact with the display surface.

The amount of the pressure applied by the finger F on the display surface is determined by the pressure determining portion 140. First, the pressure determining portion 140 determines whether or not pressure detected by the pressure detecting portion 114 changes from pressure at an earlier point in time (step S104). When it is determined at step S104 that there has been no pressure change, processing at step S104 is repeated. On the other hand, when it is determined at step S104 that the pressure has increased, it is then determined whether or not the detected pressure exceeds the pressure threshold value that is set as a next higher pressure threshold value (step S106).

In the input display device 100 according to the present embodiment, the scroll list 220 can be scrolled by changing the pressure applied to the display surface. The pressure threshold values are set for each character displayed on the scroll list 220, the size of the pressure threshold values being determined based on an arrangement order of the character. In order to move the subordinate kana characters arranged in the scroll list 220 in a forward direction (for example, in an upward-moving direction), the operation body depresses the display surface such that the pressure applied exceeds the pressure threshold values set for each subordinate kana character. Further, in order to move the subordinate kana characters arranged in the scroll list 220 in a reverse direction (for example, in a downward-moving direction), a force with which the operation body depresses the display surface is relaxed such that the pressure applied becomes less than the pressure threshold values set for each subordinate kana character.

Namely, a change over time in the amount of the pressure applied to the display surface becomes as illustrated by a graph in FIG. 6. In a state in which the "Na" key is selected from the top kana character layout keyboard 210, which is illustrated by the state (a) in FIG. 6, the character "Na" is focused when the scroll list 220 is displayed. In the scroll list 220, the character "Na" is displayed first, and then, subordinate kana characters that belong to a "Na" line ("Ni", "Nu", "Ne", "No") are displayed below the "Na" character.

The pressure threshold values for each subordinate kana character are set based on a character order. For example, the pressure threshold values gradually become larger according to the character order. The pressure threshold values for each character may be set at regular intervals as illustrated by the graph in FIG. 6 (in other words, the pressure threshold values may be set as integral multiples of a minimum pressure threshold value, namely, the pressure threshold value of "Na"). In a state in which the character "Na" is focused, when the operation body depresses the display surface and the depressing pressure against the display surface exceeds a pressure threshold value of a character "Ni", the focus moves to the character "Ni" which is the next character in order. In a similar manner, when the operation body further depresses the display surface and the depressing pressure exceeds a pressure threshold value of a character "Nu", the focus moves to the character "Nu" which is the next character in order. Further, when the operation body depresses the display surface and the depressing pressure exceeds a pressure threshold value of a character "Ne", the focus moves to the character "Ne" which is the next character in order. In this way, by depressing the display surface by the finger F while the finger F is making contact with the display surface, the scroll list 220 can be scrolled in the forward direction.

When it is determined, at step S106, that the pressure applied to the display surface has exceeded the pressure threshold value of the next character in order to a currently focused character, the operation control portion 120 moves the focus to the next character in order (step S108). Alternatively, at step S106, the operation control portion 120 may determine a maximum pressure threshold value that is exceeded by the pressure applied to the display surface, and may move the focus to a character for which the maximum pressure threshold value is set. For example, in the state (b)

in FIG. 6, when the character "Ni" is focused, if the maximum pressure threshold value that is exceeded by the pressure applied to the display surface is a pressure threshold value of the character "Ne", the focus is moved from the character "Ni" to the character "Ne". In this way, in accordance with an amount of force with which the finger F depresses the display surface, an amount of movement of the focus in a backward direction can be adjusted.

Note that when, at step S106, the pressure applied to the display surface does not exceed the next higher pressure threshold value, the focus is not moved, and processing from step S104 is repeated.

When it is determined at step S104 that the pressure has decreased, it is determined whether or not the pressure has decreased by greater than or equal to a predetermined percentage within a predetermined time period (step S110). At step S110, it is determined whether or not an input of a subordinate kana character focused in the scroll list 220 is determined. The determination is made based on the way in which the depressing force against the display surface is relaxed. For example, in a state in which the operation body depresses the display surface, when the operation body is released from the display surface, or the state changes into a state in which the operation body lightly touches the display surface, the pressure applied to the display surface decreases instantaneously to a large extent. Therefore, the pressure determining portion 140 determines that the pressure has decreased by greater than or equal to the predetermined percentage within the predetermined time period. In the present embodiment, when this kind of operation is performed, the user determines selection of the currently focused character (step S112).

For example, as illustrated in FIG. 7A, it is assumed that in a state in which a character "No" is focused in the scroll list 220, the finger F is released from the operation area 206. At this time, as illustrated by a graph in FIG. 7A, the pressure applied to an operation surface decreases dramatically within a predetermined time period T after exceeding a pressure threshold value of the character "No". At this time, the pressure determining portion 140 detects the maximum pressure during an interval of the predetermined time period T going back from a given point in time, and determines whether or not the pressure has decreased by greater than or equal to the predetermined percentage with respect to the maximum pressure. Based on the determination result, the operation control portion 120 determines selection of the character "No" that is being focused. Here, the predetermined time period T may be set at, for example, 100 msec, and the predetermined percentage may be set at, for example, 80%.

On the other hand, when it is determined at step S110 that the pressure has not decreased by greater than or equal to the predetermined percentage within the predetermined time period, it is determined whether or not the pressure has fallen below the pressure threshold value set for the currently focused character (step S114). When it is determined at step S114 that the pressure has fallen below the pressure threshold value set for the currently focused character, the operation control portion 120 moves the focus to a character preceding the currently focused character (step S116). Here, the character preceding the currently focused character is a character adjacent to the currently focused character in the scroll list 220 on a reverse direction side. As illustrated in FIG. 7A, from a state in which the character "No" is focused in the scroll list 220, the force with which the finger F depresses the display surface is slowly relaxed while the finger F is making contact with the display surface. Then, as illustrated by a graph in FIG. 7B, when the pressure applied to the display surface falls below the pressure threshold value of the character "Ne" that precedes the character "No", the scroll list 220 is moved in the reverse direction by the operation control portion 120, and the character "Ne" is focused.

In a similar manner, if the force with which the finger F depresses the display surface is further relaxed slowly, when the pressure falls below the pressure threshold value of the next character "Nu" preceding the character "Ne", the focus is moved to the character "Nu", and further when the pressure falls below the pressure threshold value of the character "Ni" preceding the character "Nu", the focus is moved to the character "Ni". Namely, by performing a reverse operation to that at step S106, step S108 and the state (b) in FIG. 6, the scroll list 220 can be scrolled in the reverse direction.

Alternatively, at step S116, the operation control portion 120 may determine the maximum pressure threshold value below which the pressure against the display surface falls, and may move the focus to the character for which the maximum pressure threshold value is set. For example, in the state (a) in FIG. 7B, when the character "No" is focused, if the minimum pressure threshold value below which the depressing pressure against the display surface falls is set as the pressure threshold value for the character "Ni", the focus is moved from the character "No" to the character "Ni". In this way, by not suddenly, but gradually reducing the force with which the finger F depresses the display surface down to the pressure threshold value of the character to be focused, the focus can be moved in the reverse direction to a large extent.

Note that when, at step S114, the pressure applied to the display surface by the operation body does not fall below the pressure threshold value of the currently focused character, the focus is not moved, and the processing from step S104 is repeated.

Next, when a selection of the subordinate character is determined at step S112 in FIG. 5A, it is determined whether or not the operation body is released from the display surface (step S118), as illustrated in FIG. 5B. The contact determining portion 130 determines whether or not the operation body is released from the display surface based on whether or not the electrostatic capacitance value detected by the contact detecting portion 112 becomes less than or equal to the predetermined electrostatic capacitance value. The contact determining portion 130 determines that the operation body is released from the display surface when the detected electrostatic capacitance value becomes less than or equal to the predetermined electrostatic capacitance value. The contact determining portion 130 determines that the operation body is not released from the display surface when the detected electrostatic capacitance value is greater than the predetermined electrostatic capacitance value.

Based on the determination, when it is determined at step S118 that the operation body is released from the display surface, the operation control processing by the operation control portion 120 is terminated. Namely, when the operation body is released from the display surface, a display in the operation area 206 returns to the top kana character layout keyboard 210, and when the operation body makes contact with the display surface the next time, the process is restarted from step S100 in FIG. 5A. Therefore, by having the operation body touch the top kana character to which belongs the kana character the user wants to input, from the top kana character layout keyboard 210, the user displays the scroll list 220 on which the subordinate kana characters are arranged. Further, by scrolling the scroll list 220 by changing the pressure applied to the display surface by the operation body, the user once more performs the processing of moving the focus to the character to be input.

On the other hand, when it is determined that the operation body is not released from the display surface, it is subsequently determined whether or not the pressure applied to the display surface by the operation body has increased (step S120). The predictive conversion input is a higher operation performed after the subordinate kana character is determined. At step S120, processing is performed to determine whether or not the predictive conversion window is displayed to perform the predictive conversion input starting with the subordinate kana character that is determined. In the present embodiment, a display screen for performing a higher input (namely, the input mode) is switched by having the operation body depress the display surface again after once relaxing the force with which the operation body depresses the display surface, while keeping the operation body in contact with the display surface. When it is determined at step S120 that the pressure has increased, the operation control portion 120 displays the predictive conversion window that displays the list of predictive conversion character strings, and the process moves to the predictive conversion input mode, in which the predictive conversion character strings can be input (step S122).

For example, as illustrated by a state (a) in FIG. 8, it is assumed that the focus is moved to the subordinate kana character the user wants to input from among the subordinate kana characters constituting the scroll list 220, and the force with which the display surface is depressed is reduced by greater than or equal to the predetermined percentage within the predetermined time period (for example, by 80% within 100 msec). At this time, when the finger F depresses the display surface again without releasing the finger F from the display surface, the predictive conversion window 230 is displayed in the operation area 206, as illustrated by a state (b) in FIG. 8. The predictive conversion window 230 displays the list of predictive conversion character strings starting from the subordinate kana character that is determined in the state (a) in FIG. 8.

A timing at which the predictive conversion window 230 is displayed is, for example, when the pressure determining portion 140 determines that the pressure applied to the display surface exceeds a predetermined repeated depressing pressure threshold value, as illustrated by a graph in FIG. 8. Alternatively, the predictive conversion window 230 may be displayed when it is determined that the pressure with which the display surface is currently depressed has increased at greater than or equal to a predetermined increase rate. When the pressure determining portion 140 recognizes such a pressure increase, the operation control portion 120 displays the predictive conversion window 230, and the process moves to the predictive conversion input mode. On the other hand, when it is not determined at step S120 that the pressure has increased, the process returns to step S118, and processing is repeated.

An operation from step S124 to step S130 is an operation after moving to the predictive conversion mode. After moving to the predictive conversion mode, it is determined whether or not the operation body is released from the display surface (step S124). It can be determined whether or not the operation body is released from the display surface by performing processing similar to that at step S118. When the operation body is released from the display surface at step S124, the operation control portion 120 determines that a focused predictive conversion character string is determined in the list that is displayed in the predictive conversion window 230 (step S126). In this case, the operation control portion 120 displays the determined predictive conversion character string in the provisional input area 204, returns the display in the operation area 206 to the top kana character layout keyboard 210, and terminates processing.

On the other hand, when it is determined at step S124 that the operation body is not released from the display surface, it is then determined whether or not the pressure detected at step S120 has increased by greater than or equal to the predetermined percentage within the predetermined time period (step S128). Step S128 is performed to determine whether or not the focus is moved to select the predictive conversion character string displayed in the predictive conversion window 230. Here, to clearly determine movements of the operation body, a dramatic increase of the force with which the operation body depresses the display surface is regarded as a determination condition at step S128. At this time, the predetermined time period T may be set at, for example, 100 msec, and the predetermined percentage may be set at, for example, 80%. When it is determined at step S128 that the pressure applied to the display surface has not increased by greater than or equal to the predetermined percentage within the predetermined time period, the process returns to step S124, and processing is repeated.

On the other hand, when it is determined at step S128 that the pressure applied to the display surface has increased by greater than or equal to the predetermined percentage within the predetermined time period, the operation control portion 120 moves the focus to the next predictive conversion character string in the list displayed in the predictive conversion window 230 (step S130). For example, as illustrated by a state (a) in FIG. 9, it is assumed that a focus 232 of the predictive conversion window 230 is located on the predictive conversion character string displayed at the top of the list. From this state, when the finger F applies pressure to the display surface such that the pressure increases by greater than or equal to the predetermined percentage within the predetermined time period (for example, greater than or equal to 80% within 100 msec), the pressure increases dramatically as illustrated by a graph in FIG. 9. When the pressure determining portion 140 recognizes such a dramatic increase of the pressure, the operation control portion 120 moves the focus 232 of the predictive conversion window 230 to a location of the next predictive conversion character string.

In this way, through repeating the operation of relaxing the force and sharply depressing the display surface, the focus within the predictive conversion window 230 can be moved. For example, as illustrated by the graph in FIG. 9, after relaxing the force while keeping the finger F in contact with the display surface, if the finger F sharply depresses the display surface three times, the focus 232 is moved three times and a state (b) shown in FIG. 9 is realized. Note that in the explanation above, the focus 232 is moved at step S128 when the increase rate of the pressure within the predetermined time period exceeds the predetermined percentage, but the focus 232 may be moved when the pressure exceeds a predetermined pressure threshold value within the predetermined time period. Then, by finally releasing the finger F, the currently focused predictive conversion character string can be determined (step S126), and a key input can be completed.

The operation control method for the character input using the operation control portion 120 according to the present embodiment is described above with reference to FIG. 5A and FIG. 5B. After determining the top kana character from the top kana character layout keyboard 210 and displaying the scroll list 220 on which the subordinate kana character is selected, by using the operation control portion 120, when the subordinate kana character is determined, the operation to be subsequently performed can be switched either by releasing the finger F from the display surface or by depressing the display surface again using the finger F without releasing it, the finger F being used as the operation body. In the above-described example, when the finger F is released from the display surface, an input of the subordinate kana character that is focused on the scroll list 220 is determined, and when the display surface is depressed again by the finger F without releasing it, the predictive conversion window 230 is displayed and the operation to input the predictive conversion character string becomes possible.

Repeated Input Operation

As another example of switching the input mode either by releasing the operation body or by depressing the display surface again by the operation body without releasing it as described above, a repeated input of the same character (repeated input mode) may be made operable instead of the predictive conversion input. For example, based on the determinations made at step S118 and step S120 in FIG. 5B, when it is recognized that the finger F has depressed the display surface again without being released, a subordinate kana character determined most recently is repeatedly input, instead of displaying the predictive conversion window 230 at step S122. Namely, by repeating the operation of depressing the display surface using the finger F, the user can input the subordinate kana character as many times as the number of times the user depresses the display surface using the finger F. As a result, when the same character is repeatedly input, it is not necessary to repeat operation of the top kana character arrangement keyboard 210 and the scroll list 220 on which the subordinate kana character is selected, and the operation can be made easier.

Note that it is set in advance whether the predictive conversion input mode for performing the above-described predictive conversion input is performed, or whether the repeated input mode is performed, when the operation body depresses the display surface again without being released after the subordinate kana character is determined.

The input display device 100 provided with the operation control portion according to the first embodiment of the present invention and the operation control method are explained above. When a kana character input keyboard such as in the present embodiment is used, the input mode can be switched either by releasing the operation body from the display surface or by depressing the display surface using the operation body again without releasing it after a kana character to be input is determined, the kana character being input by depressing the display surface using the operation body. By using this kind of operation control, it becomes possible to reduce finger and eye movements on the software keyboard.

Further, in the character input operation using the operation control method according to the present embodiment, it is not necessary to always display a next higher key input window (for example, the predictive conversion window 230 in the above-described example) in the operation area 206. Therefore, in a small device such as a mobile phone etc. with a limited display area for the software keyboard, it is possible to eliminate a display space for the predictive conversion window 230. Consequently, by using the freed-up display space, it becomes possible to make a space between input target keys and a size of the key larger, thus making it possible to reduce mistaken operation in the key input operation.

2. Second Embodiment

Figure 10:
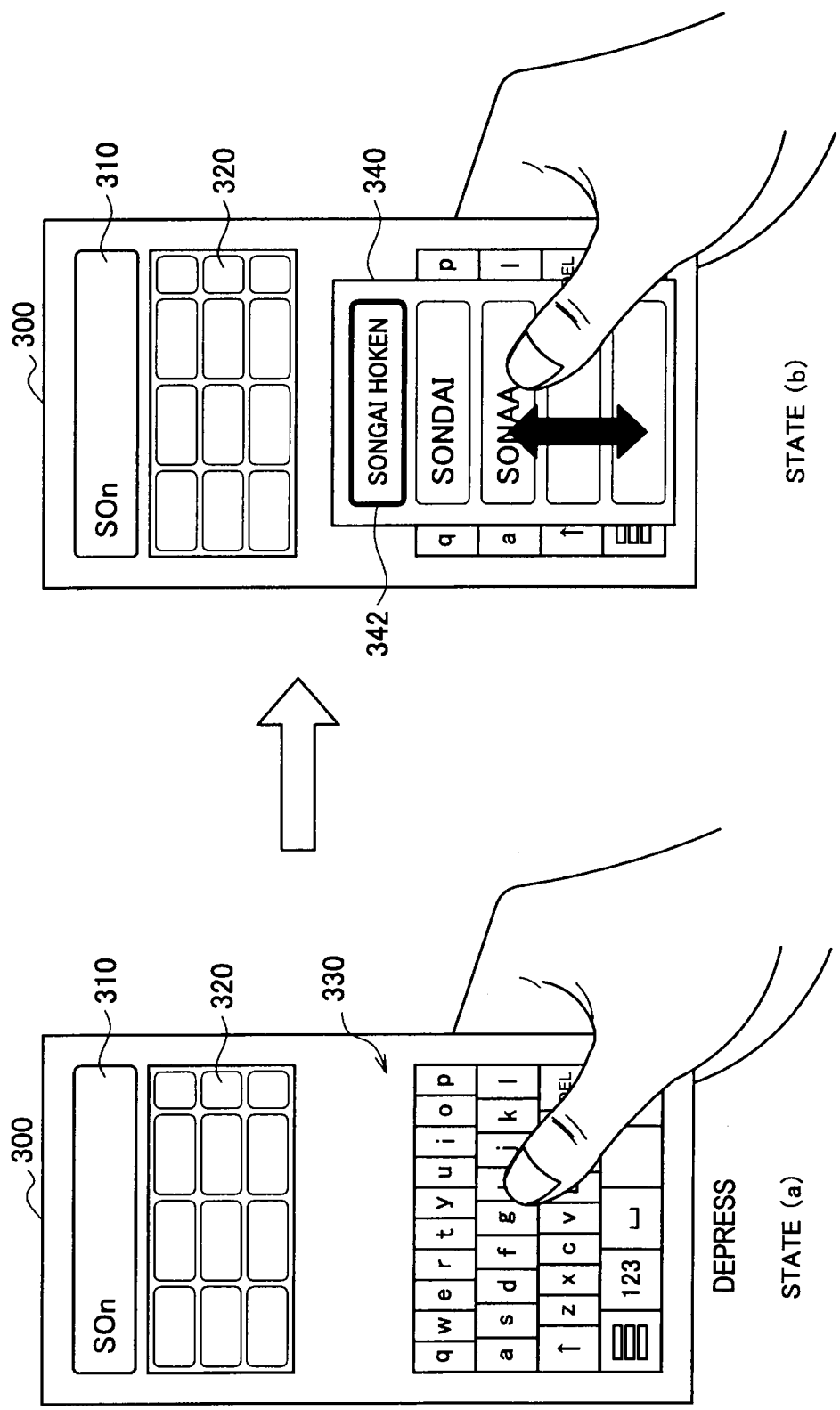
FIG. 10 is an explanatory diagram illustrating an operation of performing a predictive conversion input on an input display device according to a second embodiment of the present invention.
Figure 11:
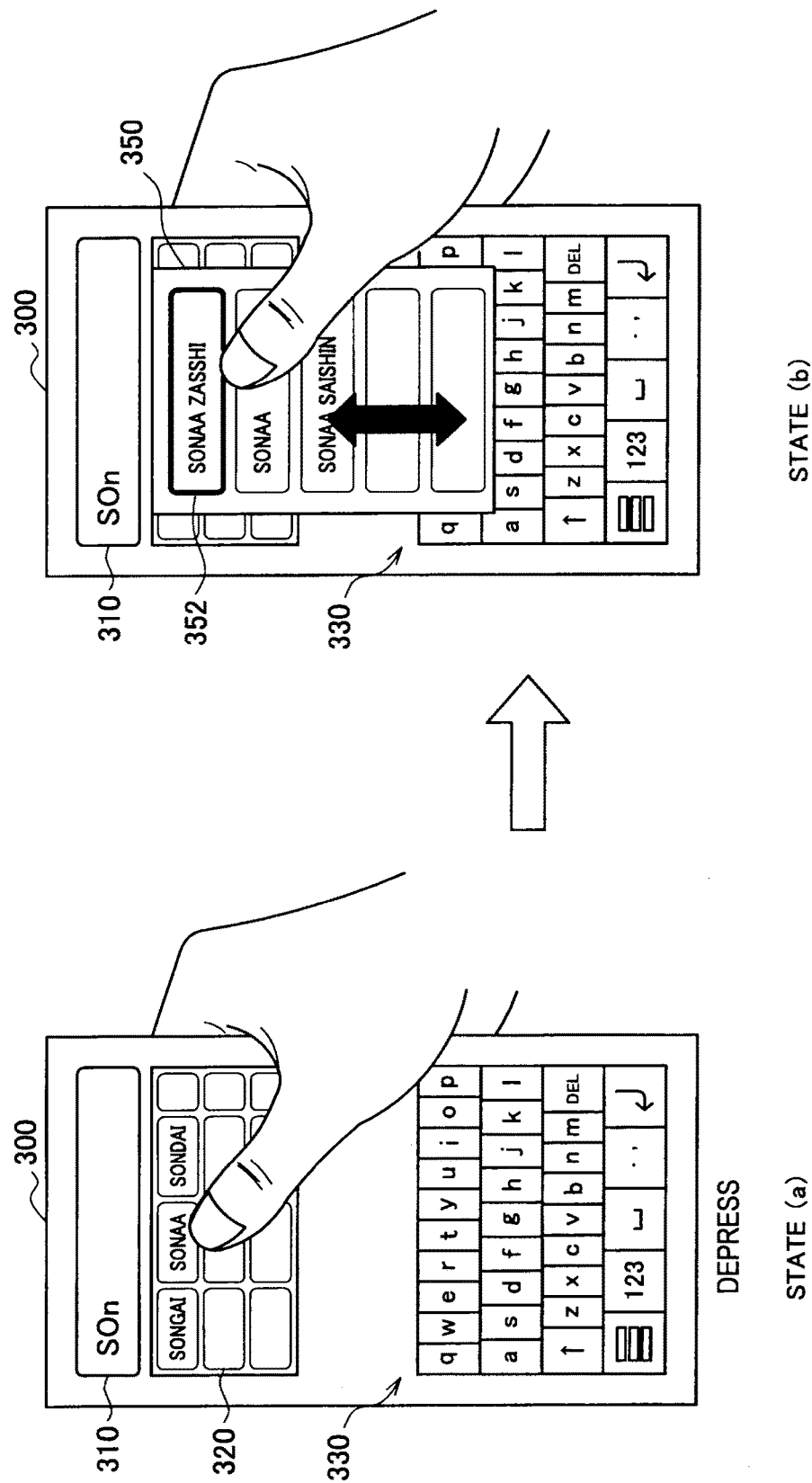
FIG. 11 is an explanatory diagram illustrating an operation of performing an auto complete input after the predictive conversion input.
Figure 12:
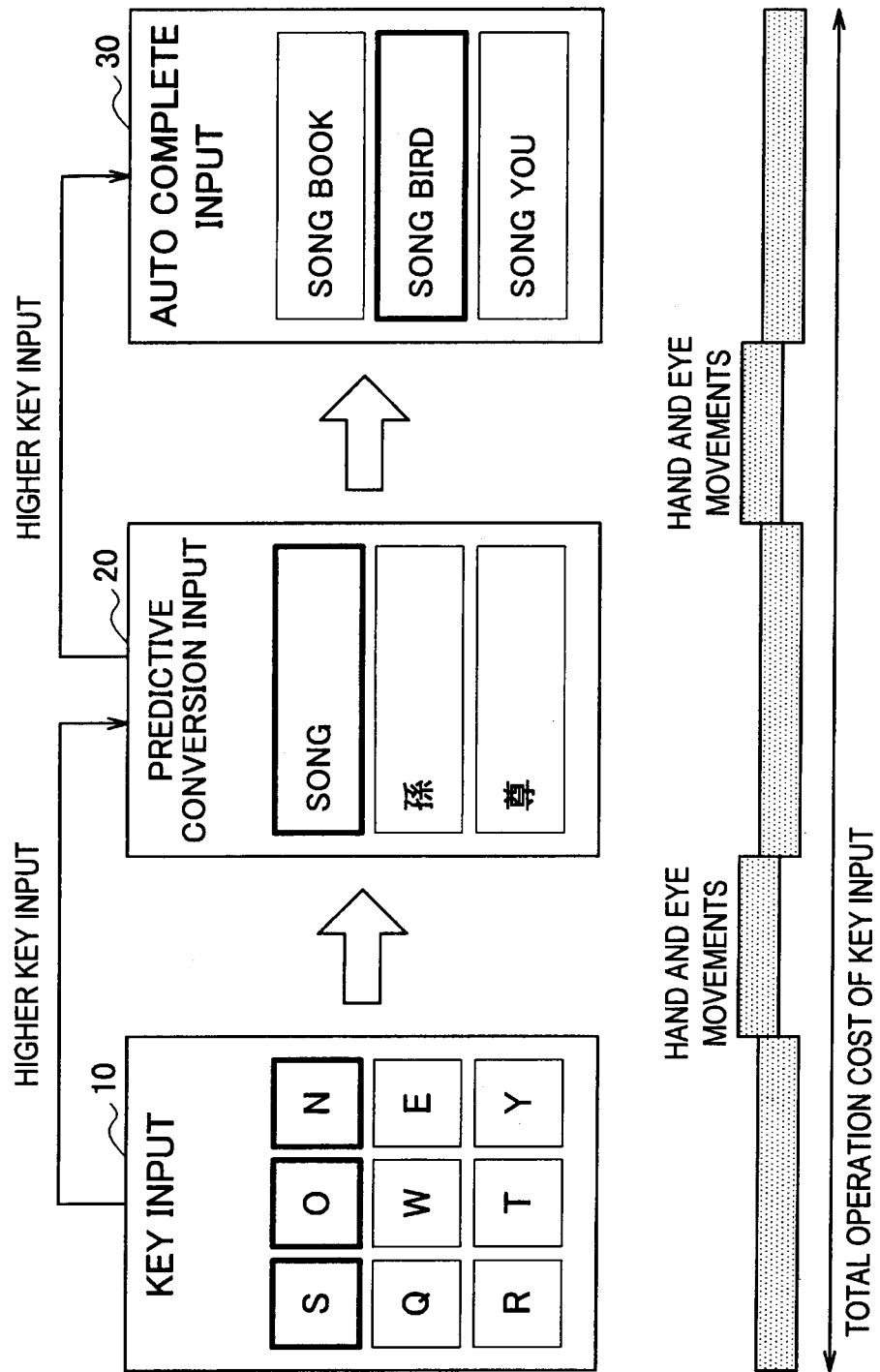
FIG. 12 is an explanatory diagram illustrating an example of a known character input operation.

Next, with reference to FIG. 10 and FIG. 11, a configuration of an input display device 300 and an operation control method according to a second embodiment of the present invention will be explained. The input display device 300 according to the second embodiment is different from the first embodiment in that it uses the software keyboard with a QWERTY key layout. Differences between the first embodiment and the second embodiment will be mainly described below. Note that FIG. 10 is an explanatory diagram illustrating an operation of performing the predictive conversion input in the input display device 300 according to the present embodiment. FIG. 11 is an explanatory diagram illustrating an operation of an auto complete input after the predictive conversion input.

In the input display device 100 according to the present embodiment, an alphabet input is possible using the software keyboard with the QWERTY key layout. As illustrated by a state (a) in FIG. 10, on a QWERTY keyboard 330, one alphabetic character is generally allocated to one key, and when the key is touched, an alphabetic character corresponding to the touched key is input in an input area 310.

In a similar manner to the first embodiment, in the input display device 300, the next higher key input operation in the key input is simultaneously performed by increasing and reducing the pressure applied to the display surface. For example, in the input display device 300, the higher key input operations of the QWERTY key input in which alphabetic characters are input include the predictive conversion input, the auto complete input etc. Thus, also in the input display device 300 according to the present embodiment, it is possible to switch the subsequent input operation either by releasing the operation body from the display surface or by depressing the display surface again using the operation body without releasing it, after selecting a character to be input from the QWERTY keyboard 330 by depressing the display surface with the operation body once and suddenly relaxing the force with which the operation body depresses the display surface.

Switching to Predictive Conversion Input Mode

For example, with reference to FIG. 10, a case in which the input mode is switched to the predictive conversion input mode after selecting the character to be input from the QWERTY keyboard 330 will be explained. First, as illustrated by the state (a) in FIG. 10, a selection is made by having the finger touch an area on which is displayed an alphabetic character that the user wants to input from the QWERTY keyboard 330. Then, when the finger is pressed against the display surface, an input of the selected alphabetic character is determined. After that, when the finger is released from the display surface, it becomes possible to input an alphabetic character to be input next from the QWERTY keyboard 330.

On the other hand, from the state (a) in FIG. 10, after relaxing the force with which the operation body depresses the display surface, the display surface is depressed again by the finger without releasing it. Then, as illustrated by a state (b) in FIG. 10, a predictive conversion window 340 is displayed, which displays predictive conversion character strings related to the alphabetic character selected in the state (a) in FIG. 10. As a result, it becomes possible for the user to select the predictive conversion character string displayed in the predictive conversion window 340. The user moves a focus 342 of the predictive conversion window 340 and focuses a character string the user wants to input, for example, by changing an amount of the depressing force applied to the display surface in a similar manner to the first embodiment. Then, when the finger F is released from the display surface, input of the focused character string is determined. Then, the predictive conversion window 340 is hidden, and it becomes possible to input the alphabetic character to be input next from the QWERTY keyboard 330.

Switching to Auto Complete Input Mode

In addition, in the input display device 300 according to the present embodiment, switching to the auto complete input mode is possible after selecting the character string from the predictive conversion input. In this example, it is assumed that the input area 310, on which a determined character is displayed, a predictive conversion display area 320 and the QWERTY keyboard 330 are displayed on the display portion. A selection is made by having the finger touch an area on which is displayed the alphabetic character that the user wants to input from the QWERTY keyboard 330. Then, when the finger is pressed against the display surface, the input of the selected alphabetic character is determined.

When the alphabetic character input from the QWERTY keyboard 330 is displayed sequentially in the input area 310, character strings that are predicted from a character string in a process of being formed in the input area 310 are displayed in the predictive conversion display area 320. When a character string the user wants to input is displayed in the predictive conversion display area 320, the user can select the character string by having the finger depress an area on which the character string is displayed. Then, when the finger is released from the display surface, the character string selected from the predictive conversion display area 320 is displayed in the input area 310, and it becomes possible to input the alphabetic character to be input next from the QWERTY keyboard 330.

On the other hand, from a state (a) in FIG. 11, after relaxing the force with which the display surface is depressed, the display surface is depressed again by the finger without releasing the finger. Then, as illustrated by a state (b) in FIG. 11, an auto complete input window 350 is displayed. In the auto complete input window 350, input candidates are displayed that include character strings that are assumed from the predictive conversion character string selected in the state (a) in FIG. 11. The user moves a focus 352 of the auto complete input window 350 and focuses an input candidate the user wants to input, for example, by changing an amount of the depressing force applied to the display surface in a similar manner to the first embodiment. Then, when the finger F is released from the display surface, an input of the focused character string is determined. Then, the auto complete input window 350 is hidden, and it becomes possible to input the alphabetic character to be input next from the QWERTY keyboard 330.

In this way, also in a case in which the software keyboard with the QWERTY key layout is used, it is possible to switch the input mode by releasing the operation body from the display surface or by depressing the display surface again using the operation body without releasing it, after determining the character to be input by depressing the display surface using the operation body.

Note that in the above-described software keyboard with the QWERTY key layout, even though switching between the three input modes is performed (the alphabetic character input mode, the predictive conversion input mode and the auto complete input mode), the present invention is not limited to such an example. For example, when the finger is released from the display surface after an alphabetic character is selected from the QWERTY keyboard 330, a lower case character of the selected alphabetic character may be input, and when the display surface is depressed again by the finger without releasing the finger, a character list including an upper case character of the selected alphabetic character, an umlaut etc. may be displayed.

Here, in the input display device 300 according to the present embodiment, the software keyboard with the QWERTY key layout in which all the alphabetic characters are displayed is used, but the alphabetic characters may be input using the software keyboard with another layout. For example, the input character may be determined in a phased manner by using a grid-patterned key arrangement similar to the first embodiment, in which a plurality of alphabetic characters are subordinate to one key. For example, it is assumed that three characters, namely "A", "B" and "C", correspond to one key. Then, for example, an alphabetic character which comes first in an alphabetic arrangement may be used as a top character of the key. In the case of the characters "A", "B" and "C", "A" becomes the top character.

When the character "B" is to be input, first, the user touches the key to which the character "B" is subordinate, and determines that the user will input one of the characters "A", "B" and "C". When the key is selected, a list of characters subordinate to the character string is displayed, and it becomes possible to input a character subordinate to the key. The list may include such characters as the upper case character and the lower case character of the subordinate character, the umlaut etc. At this time, the user can change a character selected in the list by changing an amount of force with which the display surface is depressed while keeping the finger in contact with the display surface. Then, when the finger is released from the display surface, an input of the character selected on the list at the time when the finger is released is determined.

On the other hand, the input mode can be switched to another input mode by suddenly relaxing the depressing force applied to the display surface without releasing the finger from the display surface and depressing the display surface again using the finger. For example, this operation may display the predictive conversion window in which the predictive conversion character strings related to the selected character are displayed. Namely, also in the alphabetic character input, it is possible to perform the character input in a similar manner to the input display device 100 according to the first embodiment.

The configuration of the input display device 300 provided with the operation control portion according to the second embodiment of the present invention and the operation control method are explained above. Even when the software keyboard with the QWERTY key layout similar to the present embodiment is used, it is possible to switch the input mode either by releasing the operation body from the display surface or by depressing the display surface again using the operation body without releasing the operation body from the display surface, after the kana character to be input is determined by depressing the display surface using the operation body. By using this kind of operation control, it becomes possible to reduce finger and eye movements on the software keyboard.

Further, in the character input operation using the operation control method according to the embodiment, it is not necessary to always display a screen (window) to perform the next higher input mode. Therefore, in a small device such as a mobile phone etc. with a limited display area for the software keyboard, it is possible to eliminate the display space for the higher input mode. Consequently, by using the freed-up display space, it becomes possible to make the space between input target keys and the size of the key larger, thus making it possible to reduce mistaken operation in the key input operation.

It should be understood by those skilled in the art that various modifications, combinations, sub-combinations and alterations may occur depending on design requirements and other factors insofar as they are within the scope of the appended claims or the equivalents thereof.

For example, in the above-described embodiments, the electrostatic touch panel 105 and the pressure sensor 106 are provided as the input device, but the present invention is not limited to these examples. For example, the present invention may be provided only with the pressure sensor 106. In this case, the pressure sensor 106 detects whether or not the operation body makes contact with the display surface. For example, it may be determined that the operation body has made contact with the display surface when pressure detected by the pressure sensor 106 exceeds a predetermined value.

Further, in the above-described second embodiment, the QWERTY layout is used as a key layout to input the alphabetic characters, but the present invention is not limited to this example. For example, other key layouts, such as a DVORAK layout may be used.

The present application contains subject matter related to that disclosed in Japanese Priority Patent Application JP 2009-202958 filed in the Japan Patent Office on Sep. 2, 2009, the entire content of which is hereby incorporated by reference.

What is claimed is:

1. An operation control device comprising:
a pressure detecting portion that is provided in a display portion that displays an input area in which character information is input, the pressure detecting portion detecting pressure with which an operation body depresses a display surface of the display portion to operate the input area; and
an operation control portion that switches an input mode of the character information based on a change in the pressure detected by the pressure detecting portion;
wherein the operation control portion determines an input of the character information that is selected by operation of the operation body that is in contact with the display surface, when it is detected that the pressure detected by the pressure detecting portion has decreased by greater than or equal to a predetermined percentage within a predetermined time period,
wherein subsequently, the operation control portion switches the input mode of the character information based on the change in the pressure detected by the pressure detecting portion and on the character information that is determined to be input,
wherein, after switching the input mode of the character information, a navigation through a list of selectable characters is controlled by varying the pressure with which the operation body depresses the display surface while maintaining the contact of the operation body with the display surface, and
wherein the contact of the operation body is maintained with the display surface during a whole time period beginning from the determination of the character information to be input, through the navigation through the list of selectable characters.

2. The operation control device according to claim 1, wherein, after the input of the selected character information is determined and prior to release of the contact by the operation body with the display surface, when the pressure detected by the pressure detecting portion exceeds a repeated depressing pressure threshold value, the operation control portion switches to a higher input mode used to input information that supplements the already input character information, and
wherein, when the pressure detected by the pressure detecting portion falls below a release threshold value at which it is determined that the operation body is separated from the display surface of the display portion, the operation control portion switches to a pre-set input mode.

3. The operation control device according to claim 2, wherein, in a character input mode in which one character can be input at a time, the operation control portion determines an input of a character that is selected, when it is detected that the pressure detected by the pressure detecting portion has decreased by greater than or equal to the predetermined percentage within the predetermined time period, and
wherein subsequently, when the pressure detected by the pressure detecting portion exceeds the repeated depressing pressure threshold value, the operation control portion displays at least one predictive conversion character string in the display portion, the predictive conversion character string being a predicted candidate to be input consecutively after an already input character, and switches to a predictive conversion input mode in which the predictive conversion character string can be input.

4. The operation control device according to claim 3, wherein, in the predictive conversion input mode, the operation control portion determines an input of the predictive conversion character string that is selected, when it is detected that the pressure detected by the pressure detecting portion has decreased by greater than or equal to the predetermined percentage within the predetermined time period, and
wherein, subsequently, when the pressure detected by the pressure detecting portion exceeds the repeated depressing pressure threshold value, the operation control portion displays, in the display portion, auto complete character information to which is added a character string that supplements the predictive conversion character string that is determined to be input, and switches to an auto complete input mode in which the auto complete character information can be input.

5. The operation control device according to claim 2, wherein, in the character input mode in which one character can be input at a time, the operation control portion determines the input of the character that is selected, when it is detected that the pressure detected by the pressure detecting portion has decreased by greater than or equal to the predetermined percentage within the predetermined time period, and
wherein, subsequently, when the pressure detected by the pressure detecting portion exceeds the repeated depressing pressure threshold value, the operation control portion switches to a repeated input mode in which the character that is determined to be input in the character input mode can be repeatedly input.

6. The operation control device according to claim 1, wherein, when it is detected that the pressure detected by the pressure detecting portion has decreased by greater than or equal to the predetermined percentage within the predetermined time period, and a plurality of character information correspond to the input area that is operated by the operation body, the operation control portion displays the plurality of character information that correspond to the input area in the display portion, and switches to a subordinate character input mode in which the character information can be input, when the pressure detected by the pressure detecting portion exceeds the repeated depressing pressure threshold value, and the operation control portion determines an input of top character information among the plurality of character information that correspond to the input area, and switches to a pre-set input mode, when the pressure detected by the pressure detecting portion falls below the release threshold value at which it is determined that the operation body is separated from the display surface of the display portion.

7. The operation control device according to claim 1, wherein the navigation through the list of selectable characters is performed based on a plurality of taps by the operation body upon the display surface while the contact of the operation body with the display surface is maintained.

8. The operation control device according to claim 1, wherein, prior to the switching of the input mode of the character information, the input character information is selected from a high-level information selection list, and the operation control portion subsequently switches the input mode of the character information to one of a plurality of subordinate information selection lists, based on the change in the pressure detected by the pressure detection portion and on the character information selected from the high-level information list.

9. The operation control device according to claim 1, wherein the character information is alphabetical character information.

10. The operation control device according to claim 1, wherein a release of the operating body from contacting the display surface initiates an inputting of a focused one of the selectable characters.

11. The operation control device according to claim 1, wherein a release of the operating body from contacting the display surface initiates an inputting of a focused one of the selectable characters.

12. An operation control method, comprising the steps of:
detecting pressure with which an operation body depresses a display surface of a display portion that displays an input area in which character information is input, the operation body operating the input area;

determining character information that is selected by operation of the operation body that is in contact with the display surface, when the detected pressure has decreased by greater than or equal to a predetermined percentage within a predetermined time period; and subsequently, and switching an input mode of the character information based on a change in the detected pressure and on the character information that is determined to be input, wherein, after switching the input mode of the character information, a navigation through a list of selectable characters is controlled by varying the pressure with which the operation body depresses the display surface while maintaining the contact of the operation body with the display surface, and wherein the contact of the operation body is maintained with the display surface during a whole time period beginning from the determination of the character information to be input, through the navigation through the list of selectable characters.

13. The operation control method according to claim 12, wherein the navigation through the list of selectable characters is performed based on a plurality of taps by the operation body upon the display surface while the contact of the operation body with the display surface is maintained.

14. The operation control method according to claim 12, wherein, prior to the switching of the input mode of the character information, the input character information is selected from a high-level information selection list, and the input mode of the character information is subsequently switched to one of a plurality of subordinate information selection lists, based on the change in the detected pressure and on the character information selected from the high-level information list.

15. A non-transitory computer-readable medium having embodied thereon a computer program that comprises instructions that command a computer to function as an operation control device comprising:
a pressure detecting device that detects pressure with which an operation body depresses a display surface of a display portion that displays an input area in which character information is input, the operation body operating the input area; and an operation control device that switches an input mode of the character information based on a change in the pressure detected by the pressure detecting device;

wherein the operation control device determines an input of the character information that is selected by operation of the operation body that is in contact with the display surface, when it is detected that the pressure detected by the pressure detecting device has decreased by greater than or equal to a predetermined percentage within a predetermined time period, wherein, subsequently, the operation control device switches the input mode of the character information based on a change in the pressure detected by the pressure detecting device and on the character information that is determined to be input, wherein, after switching the input mode of the character information, a navigation through a list of selectable characters is controlled by varying the pressure with which the operation body depresses the display surface while maintaining the contact of the operation body with the display surface and wherein the contact of the operation body is maintained with the display surface during a whole time period beginning from the determination of the character information to be input, through the navigation through the list of selectable characters.

16. The non-transitory computer-readable medium according to claim 15,
wherein the navigation through the list of selectable characters is performed based on a plurality of taps by the operation body upon the display surface while the contact of the operation body with the display surface is maintained.

17. The non-transitory computer-readable medium according to claim 15, wherein, prior to the switching of the input mode of the character information, the input character information is selected from a high-level information selection list, and the operation control device subsequently switches the input mode of the character information to one of a plurality of subordinate information selection lists, based on the change in the pressure detected by the pressure detection device and on the character information selected from the high-level information list.

* * * * *